(12) United States Patent
Pereira et al.

(10) Patent No.: US 10,887,333 B1
(45) Date of Patent: Jan. 5, 2021

(54) MULTI-TENANT THREAT INTELLIGENCE SERVICE

(71) Applicant: Amazon Technologies, Inc., Seattle, WA (US)

(72) Inventors: Shane Anil Pereira, Bellevue, WA (US); Stephen Chen, Seattle, WA (US); Zhuo Zhang, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 580 days.

(21) Appl. No.: 15/668,578

(22) Filed: Aug. 3, 2017

(51) Int. Cl.
*H04L 29/06* (2006.01)

(52) U.S. Cl.
CPC ........ *H04L 63/1425* (2013.01); *H04L 63/145* (2013.01); *H04L 63/1441* (2013.01)

(58) Field of Classification Search
CPC ............. H04L 63/1425; H04L 63/1441; H04L 63/145; G06F 21/552; G06F 21/50
See application file for complete search history.

(56) References Cited

U.S. PATENT DOCUMENTS

| | | | |
|---|---|---|---|
| 9,124,636 | B1 | 9/2015 | Rathor |
| 2009/0144820 | A1* | 6/2009 | Kurapati ............. H04L 63/1458 726/22 |
| 2016/0359915 | A1 | 12/2016 | Gupta et al. |
| 2017/0063920 | A1 | 3/2017 | Thomas et al. |
| 2017/0142144 | A1 | 5/2017 | Weinberger et al. |
| 2017/0163666 | A1 | 6/2017 | Venkatramani et al. |
| 2017/0171235 | A1 | 6/2017 | Mulchandani et al. |
| 2017/0272469 | A1* | 9/2017 | Kraemer ............. H04L 63/1416 |
| 2018/0113952 | A1 | 4/2018 | Brown |
| 2018/0191771 | A1 | 7/2018 | Newman et al. |
| 2018/0219882 | A1* | 8/2018 | Boatwright ......... H04L 63/1416 |
| 2018/0324208 | A1* | 11/2018 | Eliyahu ................. G06F 21/552 |
| 2018/0375831 | A1* | 12/2018 | Kliger ................ H04L 63/0263 |

OTHER PUBLICATIONS

A. Wicaksana and A. Sasongko, "Fast and reconfigurable packet classification engine in FPGA-based firewall," 2011 International Conference on Electrical Engineering and Informatics, Bandung, pp. 1-6 (IEEE 2011) (Year: 2011).*

* cited by examiner

*Primary Examiner* — Theodore C Parsons
(74) *Attorney, Agent, or Firm* — Quarles & Brady LLP

(57) ABSTRACT

Systems for providing a multi-tenant threat intelligence service are provided. The system receives threat information from a user including IP addresses, and universal threat information including IP addresses. Modify an in-memory IP address tree using IP addresses received from the user and included in the universal threat information. Compare IP addresses from logs of network activity associated with the user to the in-memory IP address tree, and identify IP addresses included in the IP address tree. Cause matching IP addresses to be sent to the user as representing potentially malicious network activity.

18 Claims, 8 Drawing Sheets

300

MULTI-TENANT THREAT INTELLIGENCE SERVICE

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

To facilitate increased utilization of data center resources, virtualization technologies may allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines may themselves be partitioned into multiple isolated virtual systems, sometimes referred to as "containers." The virtual machine controls allocation of resources such as processing power and memory, and each container has its own process and network space in which the container may, for example, execute software programs.

In such a system, a service provider may provide virtual machine resources to many different users, and may operate disparate physical computing devices that communicate with each other and with external resources over any number of networks and sub-networks of varying types. Such systems may benefit from monitoring of network traffic for potentially malicious communications. To analyze communications and resources, network monitoring services can make use of aggregated, up-to-date information about hackers and other bad actors, malware and other malicious code and communications, viruses, compromised systems, and other threats to data security and system control and reliability. Such information can be provided in, for example, a threat intelligence feed.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
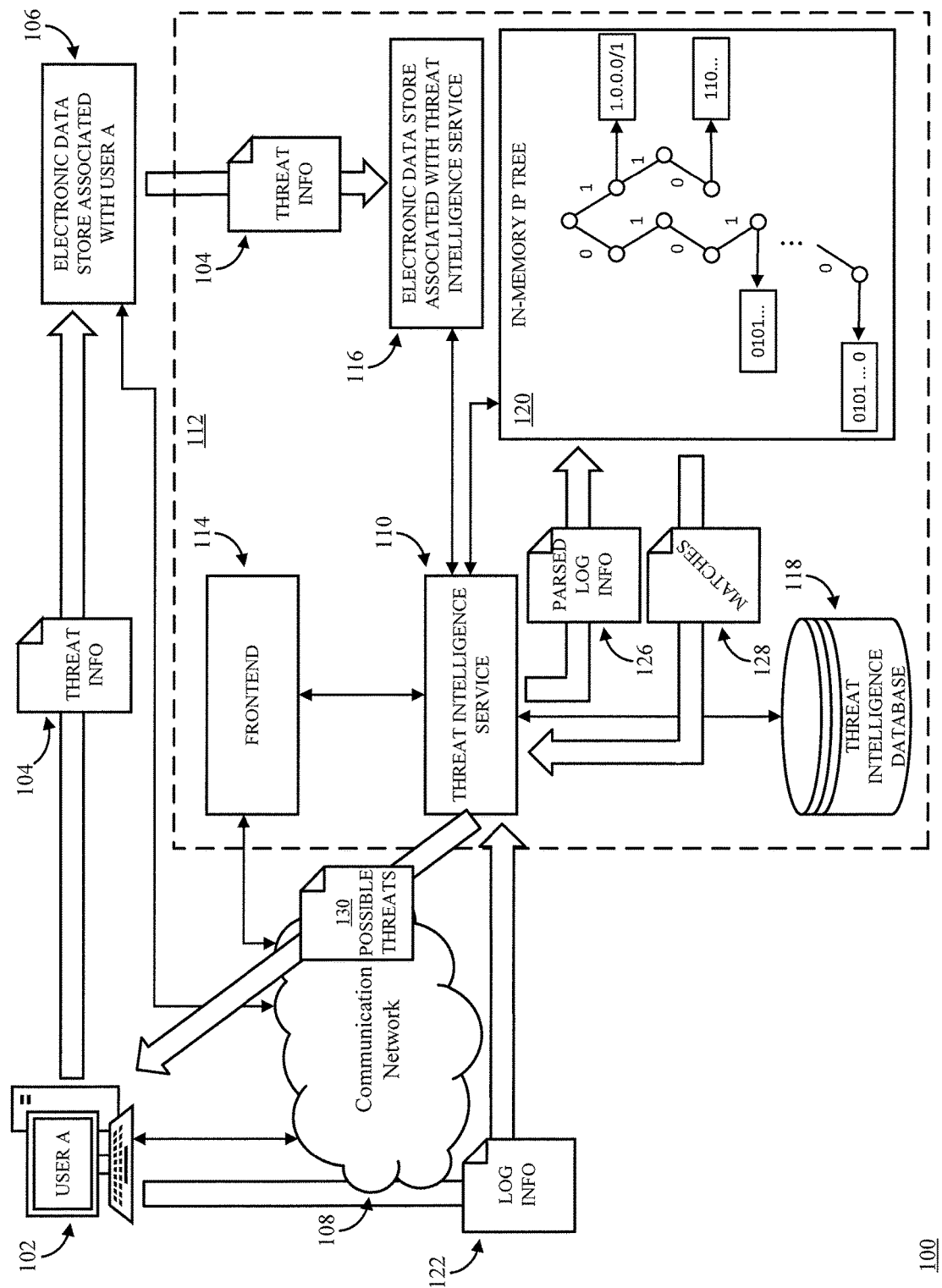
FIG. 1 is a diagram of an example system for providing a multi-tenant threat intelligence service in accordance with some embodiments of the disclosed subject matter.

Developers and/or other users that use computing environments, such as virtual networks, to perform computing operations (e.g., execute tasks for providing applications, services, database access, etc.) may wish to monitor network activity on the computing environment for activity from and/or to potentially malicious sources and/or destinations. For example, the user may subscribe to one or more feeds from various sources of threat intelligence that purportedly identifies resource characteristics, such as an Internet Protocol ("IP") address, which may represent potentially malicious actors. Accordingly, if the user has access to this information, the user would need to be able to monitor incoming and outgoing traffic to the user's computing resources on the computing environment. However, this can be complicated because the user may have to install software on the computing environment to gather data about network activity and analyze that data. This can be a relatively complex endeavor. For example, this may require that the user utilize computing resources on the computing environment to monitor activity, which may cost more and/or require that the user forgo using the same resources for other, more productive, uses. Further, the amount of network activity associated with a computing environment can be voluminous. For example, a single physical data center associated with a computing environment may produce billions or trillions of records of network activity every hour. If a significant number of users of the computing environment implemented network monitoring techniques using the computing resources of the computing environment it would create a significant amount of demand for computing resources, which may require more physical computing devices and/or higher prices to limit demand.

In some embodiments, threat monitoring software and/or a threat monitoring service (e.g., a threat intelligence service) using threat intelligence to identify potentially malicious activity can be provided and/or operated by a service provider that also operates the computing environment, or by a third party, to users of the computing environment.

Such a threat intelligence service may receive and/or access one or more threat intelligence feeds that contain information about potentially malicious computers on the Internet, such as hosts that serve exploitation tools or malware, botnet command and control hosts, and suspected compromised hosts. Threat intelligence feeds typically contain machine readable tuples of domain names, IPs, indicator types, descriptions, information sources, and other attributes of the identified threat. The threat monitoring software and/or threat intelligence service is configured by a particular user to compare a set of network events in the user's compute resources to the available threat intelligence feed(s) to find potential security issues. The effectiveness of the threat monitoring software and/or threat intelligence service is governed by the completeness, currency, and accuracy of the available threat intelligence feed(s).

The present disclosure describes a threat intelligence service that can be provided by the computing environment service provider and used by many users simultaneously to monitor network activity associated with each user's computing resources on the computing environment. As described below, the threat intelligence service can create and maintain an IP address tree (and/or other suitable data structures) that can include all IP addresses (and/or other identifying information) that have been identified by the service provider and/or one or more users as being associated with potentially malicious activity. In some embodiments, the threat intelligence service can receive threat information from users with new and/or updated threat information, and can incorporate that information into the IP address tree (and/or other data structures). For example, some users may subscribe to threat intelligence feeds that can include information on, among other things, IP addresses, domain names, URLs, etc., associated with potentially malicious activity. In such an example, such users can submit at least a portion of information from the feeds to the threat intelligence service, which can then monitor activity associated with that user's computing resources on the computing platform against threat information submitted by that user.

In some embodiments, the threat intelligence service can use log information that includes records of network activity associated with a user to determine whether any of the network activity was potentially malicious. For example, the threat intelligence service can check the IP addresses (and/or other identifying information) in the log information against the IP addresses (and/or other identifying information) in the IP address tree (and/or other data structure) to determine whether that IP address (and/or other identifying information) has been identified as being associated with potentially malicious activity. Therefore, in contrast to a "single-tenant" system that provides customized monitoring for a particular user, potentially including the user's own information and source selections, the systems herein provide a "multi-tenant" threat intelligence service that allows some or all of the users in a computing environment to both contribute threat intelligence and, in some cases, benefit from threat intelligence collected by the system from other sources (e.g., the service provider, other users, etc.). As the reliability of the information uploaded by each user may be unknown, in some embodiments the threat intelligence service can be configured to use only information from the service provider itself and information provided by that particular user.

FIG. 1 depicts an example of a system 100 for providing a multi-tenant threat intelligence service in accordance with some embodiments of the disclosed subject matter. As shown in FIG. 1, in some embodiments, system 100 can include a computing device 102 associated with a user (e.g., "user A") of a compute service. In some such embodiments, the user can be a person (e.g., a developer, a website administrator, an application administrator, etc.) or an entity (e.g., a corporation, a non-profit organization, etc.). Additionally, in some embodiments, computing device 102 can act programmatically to perform one or more actions. Although shown as a single computing device, computing device 102 can be any suitable computing device or combination of devices. Additionally, in some embodiments, actions described herein as being performed by computing device 102 can be performed by one or more virtual machines that are part of a compute service. That is, computing device 102 can be one or more virtual machines that are part of a compute service.

In some embodiments, computing device 102 can access threat information from one or more third party sources of threat intelligence information. For example, some organizations sell or otherwise allow access to threat information that identifies potentially malicious actors. In some embodiments, the threat information can include a variety of pieces of information, such as an IP address, domain name, other indicators (e.g., Uniform Resource Locator ("URL"), a file hash, a signature, etc.), descriptive information regarding the threat, identifying information of one or more sources of the information, etc. In some such embodiments, computing device 102 can access the threat information from one or more sources using any suitable technique or combination of techniques. For example, computing device 102 can download a file, can access the file as a webpage or other document, can receive the file as a push of information from the source, etc.

In some embodiments, computing device 102 can reorganize the threat information received from the source of the information into a particular format (e.g., a standardized format). Additionally, in some embodiments, computing device 102 can include in threat information 104 IP addresses, domains, etc., that are to be considered non-malicious, for example as part of a "whitelist", and/or IP addresses, domains, etc., that are to be considered malicious regardless of whether they are associated with other threat information (e.g., descriptions, sources, etc.), for example as part of a "blacklist." In some embodiments, whitelisted and/or blacklisted IP addresses can be identified using any suitable identifying information and/or can be submitted separately in a submission that is identified as a blacklist submission and/or a whitelist submission. For example, in some embodiments, a whitelist and/or a blacklist can be stored separately from other threat information 104. In some embodiments, computing device 102 can upload (and/or otherwise save) formatted threat information 104 to an electronic data store 106 associated with the user of computing device 102. For example, electronic data store 106 can be storage that is associated with the user's account on the compute service and/or a network-accessible services system. As another example, electronic data store 106 can be storage that the user account can access over a network (e.g., the Internet). As yet another example, electronic data store 106 can be storage provided by a physical computing device (e.g., a server, network attached storage, a personal computer, etc.) under the control of the user. Alternatively, in some embodiments, computing device 102 can upload and/or save threat information 104 in the format in which it was received from the source of the threat information.

In some embodiments, computing device 102 can download (or otherwise access) threat information from one or more sources, and/or upload threat information 104 to electronic data store 106 using a communication network 108. In some embodiments, network 108 can be any suitable wired network, wireless network, any other suitable network, or any suitable combination thereof. Additionally, network 108 can be any suitable personal area network, local area network, wide area network, over-the-air broadcast network (e.g., for radio or television), cable network, satellite network, cellular telephone network, any other suitable type of network, or any suitable combination thereof. For example, network 108 can be a publicly accessible network of linked networks, in some cases operated by various distinct parties, such as the Internet. In some embodiments, network 108 can be a private or semi-private network, such as a corporate or university intranet. Additionally, in some embodiments, network 108 can include one or more wireless networks, such as a Global System for Mobile Communications ("GSM") network, a Code Division Multiple Access ("CDMA") network, a Long Term Evolution ("LTE") network, any other suitable wireless network, or any suitable combination of wireless networks. Network 108 can use any suitable protocols and/or components for communicating via the Internet and/or any of the other aforementioned types of networks. For example, network 108 can use one or more protocols or combinations or protocols, such as Hypertext Transfer Protocol ("HTTP"), HTTPS, Message Queue Telemetry Transport ("MQTT"), Constrained Application Protocol ("CoAP"), etc.

In some embodiments, computing device 102 can grant access to threat information 104 stored in electronic data store 106 to a threat intelligence service 110 that is part of a computing environment 112 that can be used to provide access to a multi-tenant threat intelligence service. For example, in some embodiments, a user of computing device 102 can authorize threat intelligence service 110 to access threat information 104 that is stored in electronic data store 106 (e.g., by assigning particular permissions to threat intelligence service 110) and/or can provide information indicating where threat information 104 is stored, such as an address associated with electronic data store 106, identifying information of a storage location of threat information 104, identifying information of threat information 104 (e.g., a path name at which threat information 104 is stored), etc. In some embodiments, electronic data store 106 and threat intelligence service 110 can be provided by the same service provider.

In some embodiments, computing device 102 can send a notification to threat intelligence service 110 indicating that new or updated threat information (e.g., threat information 104) has been uploaded to electronic data store 106. For example, in connection with uploading threat information 104 to electronic data store 106, computing device can transmit a message to threat intelligence service 110 via a frontend 114. In some embodiments, the message can include information identifying threat information 104, the location at which threat information 104 is stored, etc. In some embodiments, frontend 114 can receive and process messages from computing device 102 and/or any other computing device. For example, in some embodiments, frontend 114 can serve as a "front door" to other services provided by threat intelligence service 110. Frontend 114 can process the messages received from computing devices 102 and/or generated, for example, in response to events (e.g., when computing device 102 uploads threat information 104 to electronic data store 106), and can determine whether the messages are properly authorized. For example, frontend 114 can determine whether user computing device 102 associated with the message is authorized to upload threat information for monitoring by threat intelligence service 110. In some embodiments, frontend 114 can include one or more web servers configured to expose one or more application program interfaces ("APIs") that can receive messages from one or more computing devices 102 as API calls. The frontend can extract requests from the API calls and write them to a data store associated with the threat intelligence service. In some embodiments, in addition to and/or in lieu of storing threat information 104 in electronic data store 106, computing device 102 can submit threat information 104 to threat intelligence service 110 via an API made available by frontend 114. For example, in some embodiments, computing device 102 can upload a file corresponding to threat information 104 to threat intelligence service 110 via such an API. As another example, computing device 102 can store a portion of threat information 104 in electronic data store 106, and can upload a file corresponding to a whitelist and/or a blacklist to threat intelligence service 110 via one or more APIs (note that different threat information may be submitted via separate APIs, and/or using different API calls).

In some embodiments, threat intelligence service 110 can retrieve new and/or updated threat information 104 from electronic data store 106 based on the message received from user device 102. In some embodiments, threat intelligence service 110 can copy and/or transfer threat information 104 from electronic data store 106 to an electronic data store 116 that is associated with threat intelligence service 110. In some embodiments, threat intelligence service 110 can use frontend 114 to communicate with electronic data store 106 via communication network 108 to copy and/or transfer threat information 104 to electronic data store 116 associated with threat intelligence service 110.

Additionally or alternatively, in some embodiments, threat intelligence service 110 can create and/or modify one or more entries in a threat intelligence database 118 (and/or any other suitable data structure, such as a file system, etc.) corresponding to threat information 104. In some embodiments, such an entry or entries can include a status of threat information 104 indicating whether the information contained in threat information 104 has been integrated into threat intelligence service 110. Additionally, in some embodiments, threat intelligence service 110 can use threat intelligence database 118 to store metadata from threat information 104 that is associated with a particular IP address, domain, URL, etc.

In some embodiments, threat intelligence service 110 can parse threat information 104 to identify one or more IP addresses and, in some cases, metadata related to the IP addresses (e.g., descriptions, etc.). In some embodiments, threat intelligence service 110 can use a network-accessible services system to parse the information using one or more functions that can perform such parsing on-demand. For example, threat intelligence service 110 can provide one or more portions of threat information 104 to the network-accessible services system and request that the network-accessible services system execute one or more functions to extract tuples corresponding to individual threats in the threat information, and/or extract particular portions of each tuple of threat information, and organize the parsed threat information into a format useable by threat intelligence service 110. Additionally or alternatively, in some embodiments, threat information 104 as provided can be formatted (e.g., by computing device 102 and/or any other suitable computing device(s)) to facilitate ingestion by threat intelligence service 110 prior to being provided to threat intelligence service 110. As another example, in some embodiments, threat intelligence service 110 can search threat information 104 for tuples (e.g., by searching for particular characters or combinations of characters, such as commas, semicolons, spaces, etc.; by searching for particular strings of text, etc.) corresponding to individual threats, and can extract particular information from each tuple (e.g., an IP address, a domain name, a URL, descriptions, indicator types, file hashes, etc.) such that the information can be used by threat intelligence service 110 to build a data structure (e.g., in-memory IP address tree 120) and/or provide descriptive information to a user about a potential threat when threat intelligence service 110 identifies potentially malicious activity. Threat intelligence service 110 can use the IP addresses identified from threat information 104 to build and/or update an in-memory IP address tree 120. As shown in FIG. 1, in-memory IP address tree 120 can include any suitable number of nodes that each represent a unique IP address and/or a group of IP addresses (e.g., a group of IP addresses identified as 1.0.0.0/1 in CIDR notation). As shown in FIG. 1, in-memory IP address tree 120 can be structured such that threat intelligence service 110 can determine whether a particular IP address is represented in the IP address tree 120 (e.g., by performing a bit comparison at each level of the tree to determine whether the tree includes a particular IP address). In some embodiments, based on threat information 104, threat intelligence service 110 can add any nodes to in-memory IP tree 120 that do not already exist, and can associate information with each node that represents an IP address in threat information 104 with information indicating that user A has submitted threat information (e.g., threat information 104) that references that IP address. Additionally, in some embodiments, threat intelligence service 110 can associate information with each of those nodes with other information (e.g., an indication of whether user A has whitelisted or blacklisted the IP address, descriptive information from threat information 104 about the IP address, etc.). In some embodiments, IP addresses in the IP address tree can represent IP addresses corresponding to any suitable version or combination of versions (e.g., IPv4, IPv6, etc.). Additionally or alternatively, threat intelligence service 110 can associate information identifying a database entry (or entries) corresponding to additional information about the IP address that was submitted by user A. Such a database entry in threat intelligence database 118 can be accessed to prepare information for user A related to activity associated with that IP address. Note that in-memory IP address tree 120 is merely an example of a data structure that can be used to determine whether activity in log information is suspected of being malicious.

In some embodiments, in-memory IP tree 120 can represent IP addresses associated with threat information that is universal to all users. For example, threat intelligence service 110 can have access to threat information that is not necessarily associated with any particular user. Such information can be generated by a service provider of threat intelligence service 110 and/or can be acquired from any suitable source (e.g., third party providers of threat information, sensors deployed to capture information about malicious activity, etc.).

In some embodiments, in-memory IP tree 120 can represent IP addresses associated with any suitable number of users other than user A. For example, in some embodiments, in-memory IP tree 120 can represent IP addresses for all users of threat intelligence service 110 in a particular geographic area, availability zone, and/or any other suitable group of users. As another example, in some embodiments, in-memory IP tree 120 can represent IP addresses for all users of threat intelligence service 110. In some such embodiments, each node in in-memory IP tree 120 can be associated with any suitable amount of information identifying which users of threat intelligence service 110 have submitted threat information (e.g., threat information 104) that includes that IP address. In some embodiments, in-memory address tree 120 can be replicated across any suitable number of computing devices that can be used by threat intelligence service 110 to identify potentially malicious activity. For example, in some embodiments, in-memory address tree 120 can be replicated across any suitable number of servers, virtual machine instances, containers, etc., that can each be used by threat intelligence service 110 to determine whether a submitted IP address is present in in-memory IP address tree 120 and whether the user that submitted the IP address submitted threat information that included that IP address (and/or whether the IP address matches an IP address from universal threat information). Note that, in some embodiments, the number of computing devices hosting a replica of in-memory IP address 120 can be scaled (e.g., increased or decreased) based on the number of requests being received by threat intelligence service 110. Further, in some embodiments, the number of replicas can vary by region (e.g., geographic region, availability zone, data center, etc.), and can scale independently based on the number of requests being received in that region. Additionally, in some embodiments, in-memory address tree 120 can correspond to users of treat intelligence service 110 that have compute resources in a first geographic region (or availability zone, data center, etc.), and can exclude information related to users of threat intelligence service 110 that have compute resources in other regions, but that do not have any compute resources in the first geographic region. For example, in-memory IP address tree 120 can include a first IP address received in threat information submitted by a first user that has compute resources in the first geographic region and information indicating that the IP address is associated with the first user, but can exclude information indicating that the IP address is associated with a second user that submitted threat information that includes the first IP address when the second user does not have any compute resources in the first geographic region. In some embodiments, electronic data store 116 (and/or any other suitable electronic data stores) can store universal threat information and threat information received from users of threat intelligence service 110. In some such embodiments, in-memory IP address tree 120 can be a representation of IP addresses included in current versions of the threat information in electronic data store 116. Additionally, in some embodiments, threat intelligence service 110 can create and/or recreate in-memory IP address tree 120 based on the threat information stored in electronic data store 116.

In some embodiments, as many users may obtain threat information from the same sources, threat intelligence service can create information (e.g., a database entry) for a particular IP address in a received threat information file if it does not exist, and can reference existing information (e.g., the existing database entry) for that IP address if it already exists.

As described below in connection with FIG. 2, in-memory IP tree 120 can be read-only, and a modifiable version of in-memory IP tree 120 can be modified when new and/or updated threat information is received from users (e.g., from computing device 102 associated with user A). The read-only version can then be replaced by the modified version, and a new modifiable version can be created (or the modifiable version can be copied as a read-only version).

In some embodiments, computing device 102 (and/or any other suitable computing device associated with and/or otherwise being used by user A) can create log information about activity by computing device 102 and/or any other suitable computing devices associated with computing device 102 (e.g., computing devices associated with user A). For example, if computing device 102 (and/or a user of computing device 102) is associated with one or more compute services, one or more services (e.g., provided by the same service provider that provides threat intelligence service 110), one or more accounts, etc., the log information can record activity associated with the user account(s) and/or the compute services. In a more particular example, computing device 102 can be associated with a virtual network that can use one or more compute services to execute one or more applications, provide one or more services, store information, etc. In such a more particular example, the log information can include IP addresses that have sent (and/or attempted to send) information to part of the virtual network, IP addresses to which the virtual network has sent (and/or attempted to send) information, URLs from which computing device 102 and/or the virtual network have requested information, domains which computing device 102 and/or the virtual network have visited, any other identifying information of a remote endpoint which sent (and/or attempted to send) information to part of the virtual network and/or to which the virtual network has sent (and/or attempted to send) information, etc. In some embodiments, a remote endpoint can be any computing device that is located outside of the user's compute resources and, in some cases, not associated with the service provider of the threat intelligence service. For example, a remote endpoint can be a personal computer, a tablet computer, a smartphone, a server, etc., that communicates (and/or attempts to communicate) with the user's compute resources from an IP address that is not within a subnet associated with the user's compute resources (which may include one or more subnets associated with the user, but not provided by the compute service, e.g., corresponding to a corporate intranet associated with the user).

In some embodiments, compute resources associated with a user (e.g., computing device 102 associated with user A) can be associated with a virtual machine and a corresponding virtualization system, which can implement communication managers configured to process incoming and outgoing data communications for the virtual machine instances. In some embodiments, the virtualization system can include a hypervisor and a Dom0. Additionally, in some embodiments, each virtualization system can implement data logging functionality configured to analyze incoming and outgoing data communications and generate log entries describing attributes of those data communications. For example, log entries can include the sources and destinations of data communications, source and destination ports for the data communication, an identification of a virtual network interface of the virtualization system on which the data communication was received and/or transmitted, a size of the data communication, a time that the data communication was received and/or transmitted, an identification of a product instantiated into the virtual machine to which the data communication was transmitted or from which the data communication was received, and/or any other suitable information. In a more particular example, the data logging functionality can run in the Dom0 or elsewhere, such as on a network card attached to the server hosting the virtual machine. In some embodiments, as the virtualization systems associated with the user (e.g., user A) process data communications to generate log entries, the contents of those log entities can be transmitted to a logging service (not shown) for storage. The data communication can be passed to the virtual machine via the virtualization system for processing. For example, the virtualization system can generate one or more log entries describing the reception and/or transmission of the data packet by the virtualization system. The one or more log entries can then be transmitted to the logging service by the virtualization system for storage. In some embodiments, computing device 102 and/or threat intelligence service 110 can request log information 122 from the logging service (e.g., through an API associated with the logging service). As described below in connection with FIG. 3, computing device 102 can use a cache to track log information that has been recently submitted to threat intelligence service 110, and can inhibit log information (e.g., corresponding to a new log entry) from being submitted that is duplicative of a log information (e.g., a previously submitted log entry) that has recently been submitted to threat intelligence service 110. In some embodiments, log information 122 can include one or more log entries, one or more items of information extracted from one or more log entries (and, in some cases, not the log entries themselves), one or more items corresponding to information (e.g., IP addresses) that appears at least once in a group of one or more log entries, etc.

Additionally, in some embodiments, the log information can include IP addresses, identifying information, etc., associated with a request to one or more services associated with a service provider of threat intelligence service 110 (and/or one or more other service providers). For example, the information can include IP addresses from which API calls were made to a service using account information associated with a user of computing device 102 (e.g., user A). In some embodiments, log information related to activity by computing device 102 (e.g., communication to and/or from a virtual network) and, in some cases, other computing devices associated with the user of computing device 102, can be maintained separately from log information related to API calls from user accounts associated with computing device 102. In some embodiments, such log information (or one or more portions of the log information) can be stored in any suitable location(s), such as an electronic data store associated with a user of computing device 102 (e.g., electronic data store 106), and/or an electronic data store associated with the provider of services used by computing device 102.

In some embodiments, computing device 102 can provide log information 122 to threat intelligence service 110 at any suitable time. For example, computing device 102 can provide log information 122 at regular intervals (e.g., every five minutes, every ten minutes, etc.). As another example, computing device 102 can provide log information 122 at irregular intervals (e.g., when a threshold amount of log information has been generated). Note that, although computing device 102 is described herein as providing log information 122, this is merely an example and log information 122 can be provided by any suitable computing device or combination of computing devices associated with the user. For example, in some embodiments, log information 122 can be provided by an underlying physical computing device on which computing device 102 (and/or any other computing devices associated with the user) is being executed as a virtual machine or as part of a virtual machine. For example, if computing device 102 is provided using a virtual machine, instructions (e.g., a program) being executed outside the virtual machine can generate and/or provide the log information. In a more particular example, a virtualization system can provide log information 122 to threat intelligence service 110. In some embodiments, a logging service can provide log information 122 to threat intelligence service 110.

In some embodiments, computing device 102 can provide log information 122 to threat intelligence service 110 using any suitable technique or combination of techniques. For example, in some embodiments, computing device 102 can send a file corresponding to at least a portion of the log information 122 to threat intelligence service 110 via an API made available by frontend 114. As another example, computing device 102 can provide log information 122 to a message relay service (not shown), which can be accessed by threat intelligence service 110 for newly submitted log information. In such an example, the message relay service can be configured as a first-in first-out storage from which the oldest log information is sent to threat intelligence service 110 (e.g., in response to a request from threat intelligence service 110 for log information via frontend 114 and/or communication network 108).

In some embodiments, a load balancer (not shown) can distribute log information 122 provided by computing device 102 and/or log information received from any other source among different computing devices used by threat intelligence service to parse and/or check the log information for potentially malicious activity. For example, the load balancer can distribute log information to be analyzed among a group of computing devices (e.g., physical servers, virtual machine instances, containers, etc.) that have a replica of at least a portion of an in-memory IP address tree (and/or other suitable data structure). In some embodiments, the load balancer can determine the availability and/or workload of at least a portion of computing devices executing a portion of threat intelligence service 110 (e.g., computing devices in the same region as the load balancer), and can route requests based on the workload of the various computing devices. Additionally, in some embodiments, the load balancer can stop routing log information to computing devices that are not responsive and/or are otherwise not processing log information that has previously been sent. In some embodiments, the load balancer can resend log information that was sent to a computing device that has become non-responsive. In some embodiments, the load balancer can send an alert (e.g., to an administrator of threat intelligence service 110) to indicate that a particular computing device is not processing log information.

In some embodiments, threat intelligence service 110 can parse the received log information 122 to identify IP addresses. In some embodiments, threat intelligence service 110 can parse the log information 122 to extract identifying information (e.g., IP addresses) using any suitable technique or combination of techniques, producing parsed log information 126. For example, in some embodiments, threat intelligence service 110 can extract any IP addresses in log information 122 using any suitable technique or combination of techniques to identify IP addresses in log information 122. In a more particular example, threat intelligence service 110 can cause text in log information 122 to be searched for a string of characters corresponding to an IP address (e.g., an IPv4 IP address, an IPv6 IP address, etc.). In some embodiments, threat intelligence service 110 can use a network-accessible services system to parse the log information 122. For example, threat intelligence service 110 can provide one or more portions of log information 122 to the network-accessible services system and request that the network-accessible services system execute one or more functions to extract and return IP addresses (and/or any other suitable identifying information) present in log information 122. Additionally or alternatively, in some embodiments, the log information 122 as provided can be formatted (e.g., by computing device 102 and/or any other suitable computing device(s)) to facilitate ingestion by threat intelligence service 110 prior to being provided to threat intelligence service 110. For example, log information 122 can be formatted as a string of comma separated values, where each value corresponds to an IP address (or other identifying information) to be analyzed.

In some embodiments, threat intelligence service 110 can check, for each IP address represented in parsed log information 126, whether the IP address is associated with threat information submitted by the user associated with computing device 102 (and/or threat information that is provided by threat intelligence service 110 itself). For example, for each IP address represented in parsed log information 126, threat intelligence service 110 can traverse the nodes of in-memory IP tree 120 to determine whether any of the nodes are associated with threat information that is pertinent to the user associated with computing device 102 (i.e., user A).

In some embodiments, threat intelligence service 110 can identify matching IP addresses 128 for which threat information was present in in-memory IP tree 120. Matching IP addresses 128 can include information indicating which threat information (e.g., threat information 104) the IP address was identified on, metadata about the IP address (e.g., from threat information 104), etc. Additionally or alternatively, matching IP addresses 128 can include identifying information of one or more entries in threat intelligence database 118 corresponding to the matching IP address and the threat information that is relevant to the user that submitted the log information.

In some embodiments, threat intelligence service 110 can provide a report 130 about possible threats to the services and/or accounts associated with the user of computing device 102. For example, threat report 130 can include IP addresses that were identified as potentially being malicious, information about the IP address and/or why it was identified as malicious (e.g., information that was included in threat information 104), what action(s) were associated with the IP address (e.g., was information sent from that IP addresses and/or to that IP address, was an API call made from that IP address and which account information was used to submit the API call, etc.). In some embodiments, threat intelligence service 110 can expose one or more APIs (e.g., via frontend 114) to which a user of computing device 102 can submit requests to threat intelligence service 110 to configure when, how, and/or in what format threat intelligence service 110 provides threat report 130. For example, computing device 102 can submit an API call to frontend 114 to cause threat intelligence service 110 to send threat report 130 each time potentially malicious activity is detected, when a particular number of potentially malicious activities have been detected, at predetermined periods, etc. As another example, computing device 102 can submit an API call to frontend 114 to cause threat intelligence service 110 to send threat report 130 using particular communication channels (e.g., email, push notifications, an http message to a port and/or IP address of a web server identified by the API call) and/or to otherwise make threat report 130 available (e.g., by updating a data base accessible by the user, updating a file accessible by the user, etc.).

Additionally, in some embodiments, threat intelligence service 110 can take one or more actions based on the matching IP addresses 128. For example, in some embodiments, threat intelligence service 110 can (with explicit permission granted by the user) block computing device 102 (and/or any other suitable computing device(s) associated with the user) from sending information to that IP address and/or receiving information from that IP address. In a more particular example, threat intelligence service 110 can create and/or update a security policy associated with computing device 102 on behalf of the user of computing device 102 to block communication with the IP address (e.g., by sending a request to an API associated with a compute service that provides access to computing device 102 to block communications with the IP address). In another more particular example, threat intelligence service 110 can cause a Dom0 associated with computing device 102 to update the IP addresses blocked by a firewall being executed by the physical computing device executing a virtual machine providing access to computing device 102 (e.g., using a program such as iptables). As yet another more particular example, threat intelligence service 110 can create and/or update a set of network security rules (sometimes referred to as a security group) associated with one or more physical and/or virtual network interfaces (e.g., by submitting a request to an API associated with a service that provides computing device 102, such as a compute service) used by computing device 102 (and/or any other suitable computing devices associated with the user) to block communication to and/or from the IP address using a network interface using the security group. In such an example, the security group can be a security group already associated with the network interface, and/or can be a new security group created by threat intelligence service 110 and associated with the network interface(s). In some embodiments, threat intelligence service 110 can create and/or update a security policy that includes IP address identified as being potentially malicious in threat information 104 associated with the user and/or in universal threat information, prior to receiving log information 122. In such embodiments, a user can choose to implement the security policy created by threat intelligence service 110 to preemptively block communication to and/or from IP addresses (and/or endpoints identified by other identifying information).

As another example, threat intelligence service 110 can suspend access by an account used to submit an API call from a suspected malicious IP address and/or otherwise revoke access by the account. In a more particular example, in some embodiments, threat intelligence service 110 can submit a request to an API associated with a service that maintains and/or verifies credentials to suspend permissions for the account. In some embodiments, a user associated with computing device 102 can be required to grant permissions to threat intelligence service 110 to take actions to block communications from particular endpoints on behalf of the user. In some embodiments, threat intelligence service 110 can expose one or more APIs (e.g., via frontend 114) to which a user of computing device 102 can submit requests to threat intelligence service 110 to take an action (e.g., by creating and/or updating security policies, causing an IP address to be blocked by a firewall, etc.) on behalf of the user based on IP addresses included in threat information 104 (and/or universal threat information) without further user intervention. For example, computing device 102 can submit an API call to frontend 114 to cause threat intelligence service 110 to block an IP address in response to threat information 104 indicating that the IP address is associated with malicious activity with a particular level of confidence (e.g., high confidence).

Although threat intelligence service 110 is generally described as identifying potentially malicious IP addresses from log information 122 using in-memory IP address tree 120, this is merely an example, and any suitable identifying information related to network activity can be identified. For example, URLs and/or domains can be identified using a hash table in which each URL and/or domain received in threat information (e.g., threat information 104) corresponds to an output of a hash function. In such an example, each URL and/or domain in log information 122 can be hashed using the hash function and compared against outputs corresponding to threat information to determine whether any of the URLs and/or domains in log information 122 is associated with potentially malicious activity. As another example, URLs and/or domains can be identified using a prefix tree in which top level domains are at the roots, and successive parts of a domain name branch at each level. In a more particular example, if threat information includes the domains http (colon)//www (dot) example (dot) com, and https (colon)//example1 (dot) net, the prefix tree can include roots for top level domains ".com" and ".net," with hierarchies descending such that the second-level domain name "example" forms a node below ".com" and "example1" forms a node below ".net," and so on. As yet another example, in addition to or in lieu of the in-memory IP address tree, IP addresses, domain names, etc., can be maintained in a relational database and/or non-relational database using the identifying information (or, e.g., a hash of the identifying information) as a key. In some embodiments, an entry in any suitable data structure used in identifying potentially malicious activity can be associated with identifying information of one or more users (if any) that submitted threat information corresponding to the entry (e.g., an IP address, a URL, a domain name, a file hash, a file signature, etc.).

As still another example, any other activity can be included in threat information received from a user of computing device 102 and/or as part of log information associated with the user. In a more particular example, signatures of files uploaded to and/or downloaded by computing device 102 (and/or any other suitable computing device associated with the user) can be received in log information and compared to corresponding threat information received from the user (e.g., threat information 104) and/or universal threat information. As another more particular example, other process activity such as database queries submitted to computing device 102 (and/or any other suitable computing device associated with the user), state changes (e.g., registry keys, settings, credentials, permissions, etc.) to computing device 102 (and/or any other suitable computing device associated with the user), etc. Such information can be checked against threat information using any suitable data structure.

Figure 2:
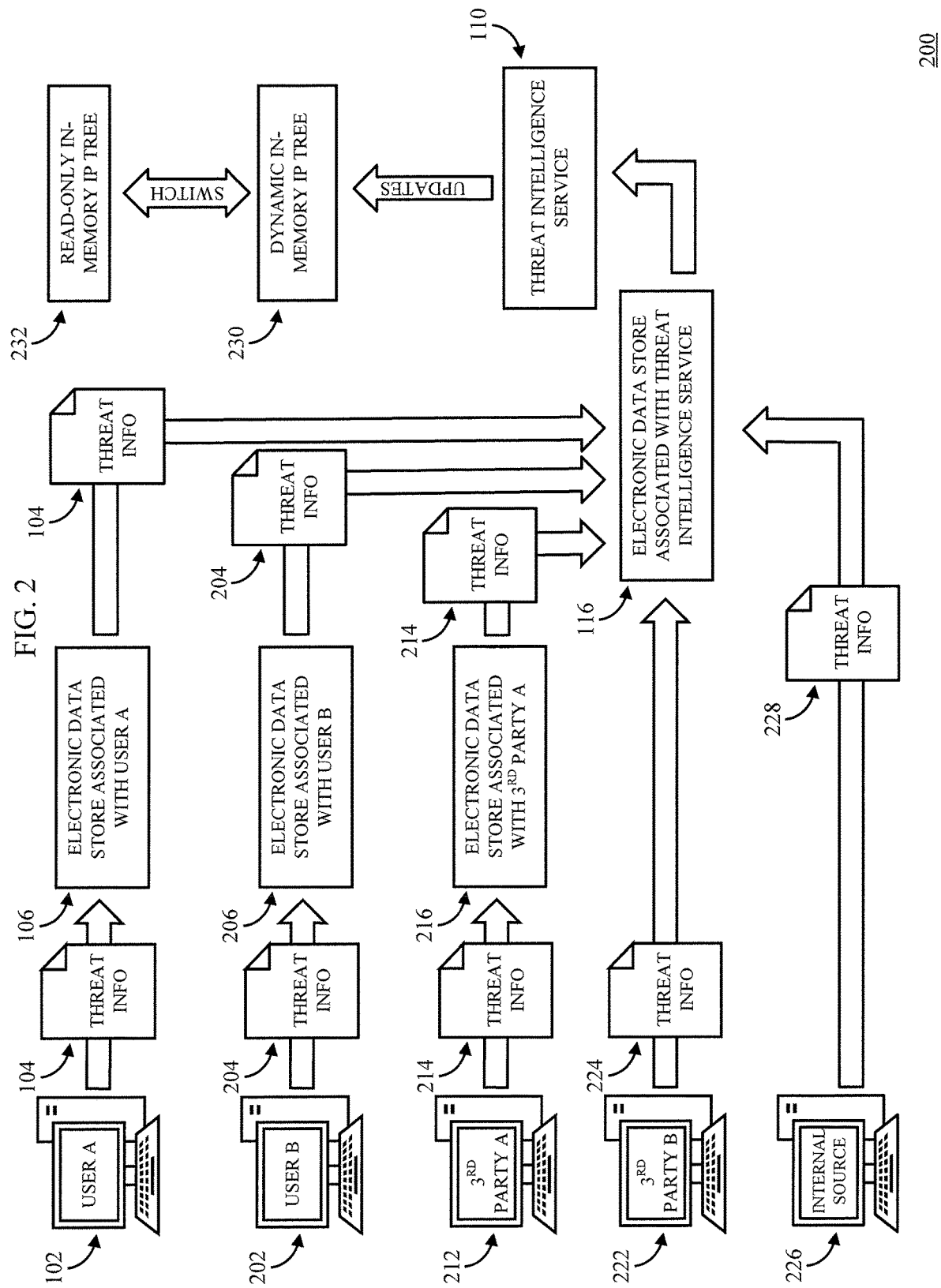
FIG. 2 is a diagram of an example system for processing multiple sources of threat information that can be used to generate an in-memory IP tree in accordance with some embodiments of the disclosed subject matter.

FIG. 2 shows an example 200 of multiple sources of threat information that can be used to generate an in-memory IP tree in accordance with some embodiments of the disclosed subject matter. As shown in FIG. 2, threat intelligence service 110 can retrieve threat information 104 stored in electronic data store 106 and/or threat intelligence data store 116 by user device 102 as described above in connection with FIG. 1. Additionally, users associated with other computing devices 202, 212, 222, 226 and/or user accounts can submit threat information 204, 214, 224, 228 that may be different than threat information 104. For example, a user ("user B") associated with a computing device 202 can upload threat information 204 to an electronic data store 206 associated with user B, and can indicate to threat intelligence service 110 that new and/or updated threat information has been stored in electronic data store 206. As described above in connection with threat information 104 of FIG. 1, threat intelligence service 110 can use threat information 204 to identify which IP addresses to add to an in-memory IP address tree (e.g., in-memory IP address tree 120) and/or which IP addresses to associate with threat information 204.

In some embodiments, threat intelligence service 110 can use other information to create at least a portion of an in-memory IP address tree (e.g., in-memory IP address tree 120) that can be used to determine whether activity associated with a particular user (e.g., user A, user B, etc.) is potentially malicious. For example, a computing device 212 associated with a third party provider ("third party A") of threat information (e.g., threat information 214) can upload the threat information to an electronic data store 216 associated with third party A, and threat intelligence service 114 can retrieve new and/or updated threat information from electronic data store 216. In such an example, threat intelligence service 110 can retrieve threat information 214 from electronic data store 216 in response to a message from computing device 212 (e.g., received via frontend 114) and/or can periodically (either at regular or irregular intervals) retrieve threat information from electronic data store 216 regardless of whether a message is received. Additionally, in such an example, third party A can grant permissions to threat intelligence service 110 to access threat information in electronic data store 216.

As another example, a computing device 222 associated with a third party provider ("third party B") of threat information (e.g., threat information 224) can upload and/or otherwise send new and/or updated threat information directly to electronic data store 116 as pushed data and/or in response to a request for such data from threat intelligence service 110 (e.g., sent via frontend 114).

In some embodiments, threat intelligence service 110 can use information created by the service provider to create at least a portion of an in-memory IP address tree (e.g., in-memory IP address tree 120) that can be used to determine whether activity associated with a particular user (e.g., user A, user B, etc.) is potentially malicious. For example, the service provider can deploy sensors (e.g., honeypots), executing applications that are suspected of being malicious and recording resulting network activity (e.g., using a virtual machine to execute the application in a sandbox), etc.

In some embodiments, as threat information is received, threat intelligence service 110 can generate and/or modify a dynamic in-memory IP address tree 230 by adding and/or removing nodes, associating and/or disassociating information with one or more nodes based on the received threat information, etc. Additionally, in some embodiments, threat intelligence service 110 can use a read-only in-memory IP address tree 232 to determine whether any potentially malicious activity has been recorded for a user (e.g., based on log information 122). In some embodiments, read-only in-memory IP address tree 232 can be updated with the changes made to dynamic in-memory IP address tree 230 at any suitable intervals and/or in response to any suitable event(s). For example, read-only in-memory IP address tree 232 can be updated every five minutes, ten minutes, fifteen minutes, or any other suitable amount of time. As another example, read-only in-memory IP address tree 232 can be updated when at least a threshold number of changes have been made to dynamic in-memory IP address tree 230. In some embodiments, the changes to read-only in-memory IP address tree 232 can be made using any suitable technique or combination of techniques. For example, dynamic in-memory IP address tree 230 can be made read-only, and can take the place of read-only in-memory IP address tree 232, which can be replaced by a copy of dynamic in-memory IP address tree 230. In such an example, the in-memory address trees can switch back and forth from being read-only to modifiable and back. As another example, the changes to read-only in-memory IP address tree 232 can be made by replacing the configuration of read-only in-memory IP address tree 232 with the current configuration of dynamic in-memory IP address tree 230.

Figure 3:
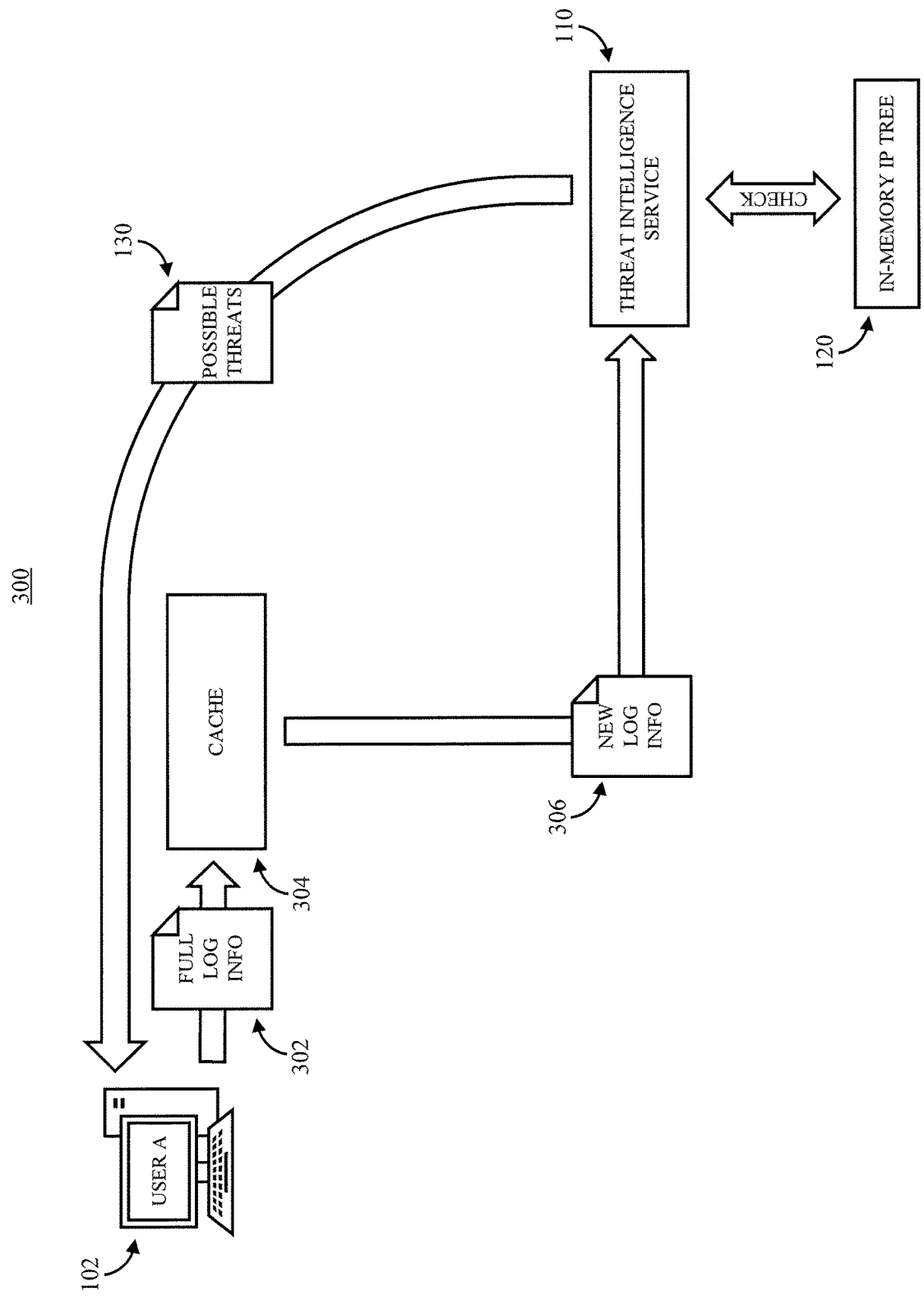
FIG. 3 is a diagram of an example system for providing log information from a computing device associated with a user to the threat intelligence service in accordance with some embodiments of the disclosed subject matter.

In some embodiments, read-only in-memory IP address tree 232 can be replicated across different geographic regions, availability zones, etc., such that regardless of where the log information is received from a user, threat intelligence service 110 in that FIG. 3 shows an example of a portion of a system 300 for providing log information from a computing device (e.g., computing device 102) associated with a user to the threat intelligence service 110 in accordance with some embodiments of the disclosed subject matter. As shown in FIG. 3, computing device 102 can compare log information 302 that has not been provided to threat intelligence service 110 to a cache 304 of log information that has recently been provided to threat intelligence service 110. For example, computing device 102 can use cache 304 to store log information that has been sent to threat intelligence service 110 in the last hour, two hours, 12 hours, 24 hours, 48 hours, etc. In some embodiments, cache 304 can be any suitable electronic data store, and can be provided as a service by the service provider of threat intelligence service 110 (or any other suitable service provider). Additionally or alternatively, cache 304 can be part of a physical computing device controlled by a user of computing device 102.

In some embodiments, based on the comparison of the log information 302 to log information in cache, computing device 102 can provide new log information 306 that includes, for example, IP addresses from log information 302 that do not appear in cache 304. As described above in connection with FIG. 1, new log information 306 can be provided to threat intelligence service 110 by computing device 102 (and/or any other suitable source). Threat intelligence service 110 can compare new log information 306 to in-memory IP tree 120 to determine whether there are any matching IP addresses, and can provide threat report 130 based on any matches. In some embodiments, providing only new log information can reduce the amount of log information that threat intelligence service 110 is requested to process, which can, in some cases, increase the speed with which potentially malicious activity can be identified, and/or can increase the number of users that can be served.

Figure 4:
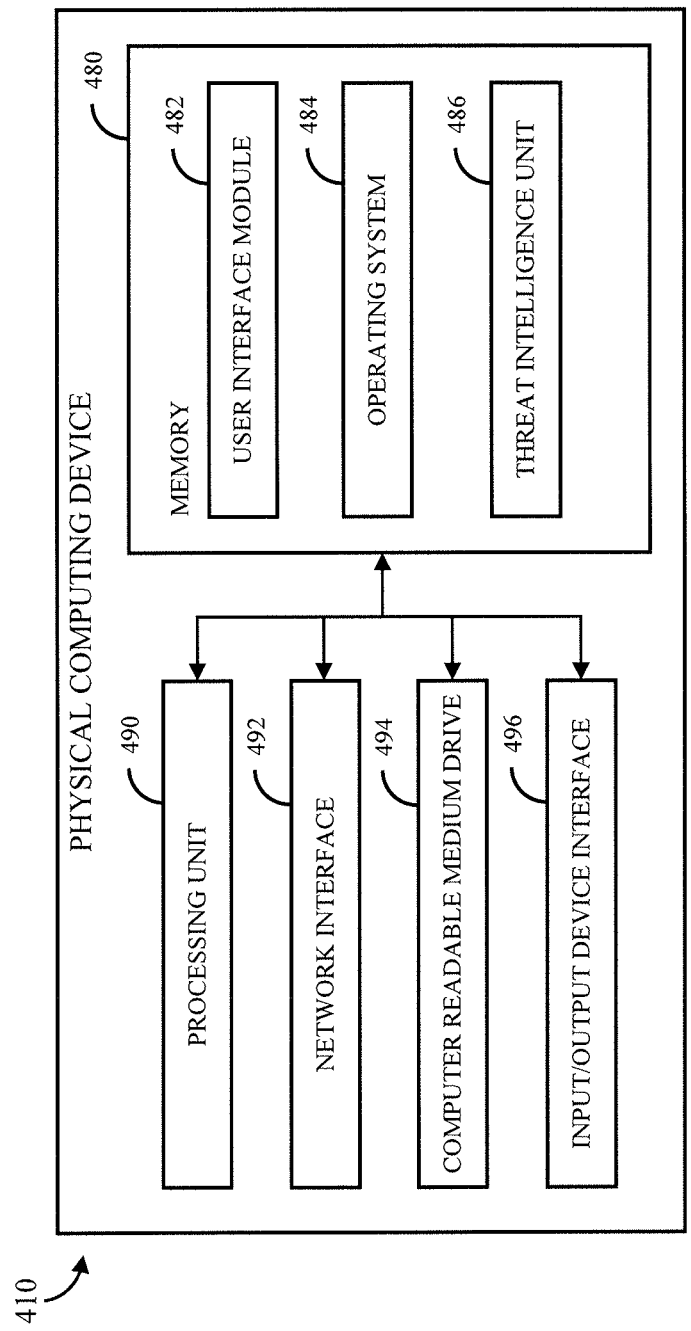
FIG. 4 is a diagram of an example general architecture of a computing system that determines whether activity of users computing systems and/or user accounts are associated with network information (e.g., an IP address) that has been identified as potentially being malicious in accordance with some embodiments of the disclosed subject matter.

FIG. 4 shows an example of a general architecture of a physical computing device 410 (e.g., a server) that can be used to provide access to at least a portion of the mechanisms described herein (e.g., as a portion of threat intelligence service 110) to determine whether activity of users computing systems and/or user accounts are associated with network information (e.g., an IP address) that has been identified as potentially being malicious in accordance with some embodiments of the disclosed subject matter. The general architecture of threat intelligence service depicted in FIG. 4 includes an arrangement of computer hardware and/or software modules that can be used to implement aspects of the disclosed subject matter. The hardware modules may be implemented with physical electronic devices, as described below, and physical computing device 410 can include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 1. As illustrated, physical computing device 410 includes a processing unit 490, a network interface 492, a computer readable medium drive 494, and an input/output device interface 496, all of which can communicate with one another by way of a communication bus. Network interface 492 can provide connectivity to one or more networks or computing systems. The processing unit 490 can thus receive information and instructions from other computing systems or services via communication network 108. Processing unit 490 can also communicate to and from memory 480 and further provide output information for an optional display (not shown) via the input/output device interface 496. The input/output device interface 496 can also accept input from one or more optional input device (not shown).

Memory 480 can contain computer program instructions (e.g., grouped as modules in some embodiments) that processing unit 490 executes in order to implement one or more aspects of the disclosed subject matter. In some embodiments, memory 480 can include RAM, ROM, EEPROM, one or more flash drives, one or more hard disks, one or more solid state drives, one or more optical drives, etc., any other suitable persistent, auxiliary, or non-transitory computer-readable media, or any suitable combination thereof. Memory 480 can store an operating system 484 that provides computer program instructions for use by processing unit 490 (e.g., in the general administration and operation of threat intelligence service 110). Memory 480 can further include computer program instructions and other information for implementing aspects of the disclosed subject matter. For example, in some embodiments, memory 480 can include a user interface module 482 that generates user interfaces (and/or instructions therefor) for display upon a computing device, e.g., via a navigation and/or browsing interface such as a browser or application installed on the computing device. In addition, memory 480 can include and/or communicate with one or more data repositories (not shown), for example, to access threat information, an in-memory IP address tree, program codes, libraries, etc.

In some embodiments, memory 480 can include a threat intelligence unit 486 that may be executed by processing unit 490 to provide at least a portion of computing environment 112. For example, in some embodiments, physical computing device 410 can execute a virtual machine instance that can use threat intelligence unit 486 to implement at least a portion of the threat intelligence service 110. In a more particular example, as described below in connection with FIG. 5, threat intelligence unit 486 can include one or more software images that can be used by a virtual machine instance to implement a portion of threat intelligence service 110 (e.g., by receiving log information from one or more users for comparison to an in-memory IP address tree, maintaining the in-memory IP address tree, and comparing IP addresses received as part of log information from a user to the in-memory IP address tree, etc.). In some embodiments, threat intelligence service 110 can be implemented using any suitable number of physical computing devices (e.g., physical computing device 410) in any suitable locations.

Figure 5:
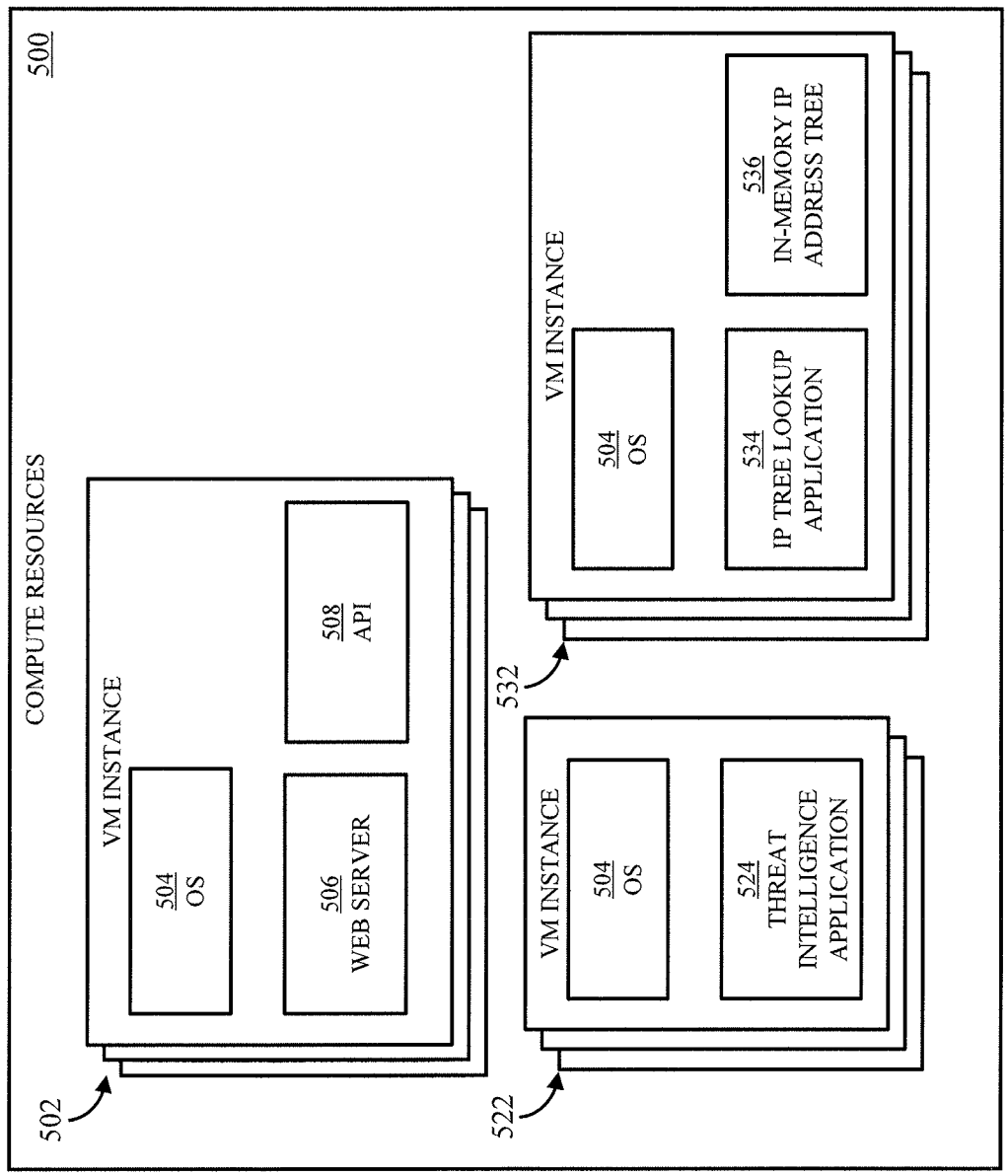
FIG. 5 is a diagram of an example of compute resources that can be used to implement one or more portions of system shown in FIG. 1 in accordance with some embodiments of the disclosed subject matter.

FIG. 5 shows an example of a portion of compute resources 500 that can be used to implement one or more portions of system 100 shown in FIG. 1 (e.g., threat intelligence service 110) in accordance with some embodiments of the disclosed subject matter. In some embodiments, virtual machine instances deployed in compute resources 500 can be provided through a compute service that provides access to virtual machine instances that can launch and execute a variety of applications from software images. For example, in some embodiments, compute resources 500 can include any suitable number of virtual machine instances, such as virtual machine instances 502, 522, and 532. In some embodiments, a "virtual machine instance" can refer to a specific allocation of virtual computing resources that has the properties of a particular virtual machine (VM) and is configured to launch and run software. For example, a virtual machine instance can be launched from a virtual machine image, which can, for example, represent the entire state of a virtual machine instance at the time it was imaged, such that a virtual machine instance and any software applications installed on the virtual machine instance can be restored to that point by restoring/launching the virtual machine image. As another example, software can be launched by a virtual machine instance using one or more software images, which can, for example, represent the entire state of a software application at the time it was imaged, such that the software application can be restored to this point by restoring/launching the software image. In some embodiments, a virtual machine instance 502 can execute software to provide the functionality of a web server based on a virtual machine image and/or one or more software images provided by a user of the virtual machine instance (e.g., a service provider associated with threat intelligence service 110).

As shown in FIG. 5, in some embodiments, VM instances 502 can have an OS 504, software 506 for providing web server functionality, and software 508 for providing one or more APIs that can be exposed to users of the threat intelligence service (e.g., as part of frontend 114). For example, VM instances 502 can receive requests from users (e.g., from computing device 102) of threat intelligence service 110 with log information (e.g., log information 122) to be evaluated for potentially malicious activity as an API call that is evaluated using API 508. In such an example, API 508 can evaluate the API call, and based on the contents of the API call, can cause the log information to be delivered to a threat intelligence service.

In some embodiments, VM instance 522 can have OS 504, and software 524 for providing a threat intelligence application that can be used to implement at least a portion of threat intelligence service 110. For example, threat intelligence application 524 can receive log information associated with a particular user (e.g., via an API provided by VM instances 502), can parse the log information (e.g., to identify IP addresses included in the log information), and can submit the parsed log information to be evaluated using an in-memory IP address tree.

In some embodiments, VM instance 532 can have OS 504, software 534 for providing an application that checks an IP address tree for the presence of a particular IP address, and software 536 for maintaining an in-memory IP address tree in memory allocated to VM instance 532. For example, VM instance 532 can receive parsed log information that includes one or more IP addresses from a VM instance 522 executing threat intelligence application 524. In such an example, VM instance 532 can use software 534 to determine whether each IP address is in the in-memory IP address tree. VM instance 532, using the software 534, can return information about whether each IP address is included in the in-memory IP address tree. More particularly, when an end user-generated communication, such as a request to use a customer's compute resources, is received by the system, the VM instance 532 can use the software 534 to identify the customer from the request, and also to identify an IP address of interest, such as the source IP address or the IP address of resources identified in the request. The software 534 enables the VM instance 532 to convert the IP address into bit-format, and the VM instance 532 begins to scan a corresponding path in the in-memory IP address tree. If in tracing the path through the tree that is prescribed by the IP address the VM instance 532 reaches a node of the tree that contains information, the IP address is malicious; otherwise, the IP address is not currently marked as potentially malicious.

If the IP address is malicious, next the VM instance 532 determines if the customer is associated with the node. For example, the VM instance 532 may determine whether the customer is subscribed to the feed that the IP address was found in, as identified by the information in the node of the tree. If so, then the VM instance 532 sends a response to the service indicating a threat was identified. Additionally or alternatively, VM instance 532 can use software 536 to update the endpoint identifiers (i.e., the nodes of the in-memory IP address tree), such as my merging customer-supplied malicious resource lists with the tree as described above. Note that, in some embodiments, each VM instance can be associated with one or more APIs for communicating with other VM instances in compute resources 500, and/or can communicate via another VM instance providing API functionality (e.g., VM instance 502).

In some embodiments, computing device 102 (and/or any other suitable compute resources associated with the user of computing device 102) can be provided using one or more VM instances executed by compute resources 500. For example, the user can launch one or more VM instances for providing a web server to host a web page, one or more instances for providing access to an application server that provides an application via the web page, etc. Additionally or alternatively, in some embodiments, compute resources associated with the user can be provided by one or more physical computing devices owned by the user (e.g., in a data center operated by, or on behalf of the user), by a different compute service, etc. In some embodiments, compute resources 500 can represent any suitable number of physical computing devices (e.g., servers) located in any suitable number of locations (e.g., one or more data centers, which may or may not be interconnected with low latency links). In some embodiments, information can be distributed amongst multiple VM instances providing the same or similar functionality (e.g., VM instances 502) using a load balancer (and/or any other suitable technique or combination of techniques).

Note that although FIG. 5 is described in connection with a compute service, a network-accessible services system can be provided using a similar configuration of hardware and software devices. For example, a network-accessible services system can be used to run various program codes on-demand using virtual computing resources provided by compute resources 500. In a more particular example, a service provider can configure the network-accessible services system to receive requests to execute program codes from a user (e.g., user A, threat intelligence coordination service 110, frontend 114, etc.) without requiring that the user configure a particular virtual machine instance, one or more containers executed by the virtual machine instance, etc. In some embodiments, the network-accessible services system can receive the code to be executed (and/or identifying information of code to be executed), information to be used in executing the code, etc., can assign a VM instance to execute the code, and in some cases, provide output that is generated during execution of the code. In some embodiments, VM instances of a network-accessible services system may not be associated with a particular user, but may instead be used by many different users (simultaneously and/or serially) to execute program codes. In some embodiments, a network-accessible services system can be used to provide any other suitable functionality described herein (e.g., parsing threat information, parsing log information, etc.).

Figure 6:
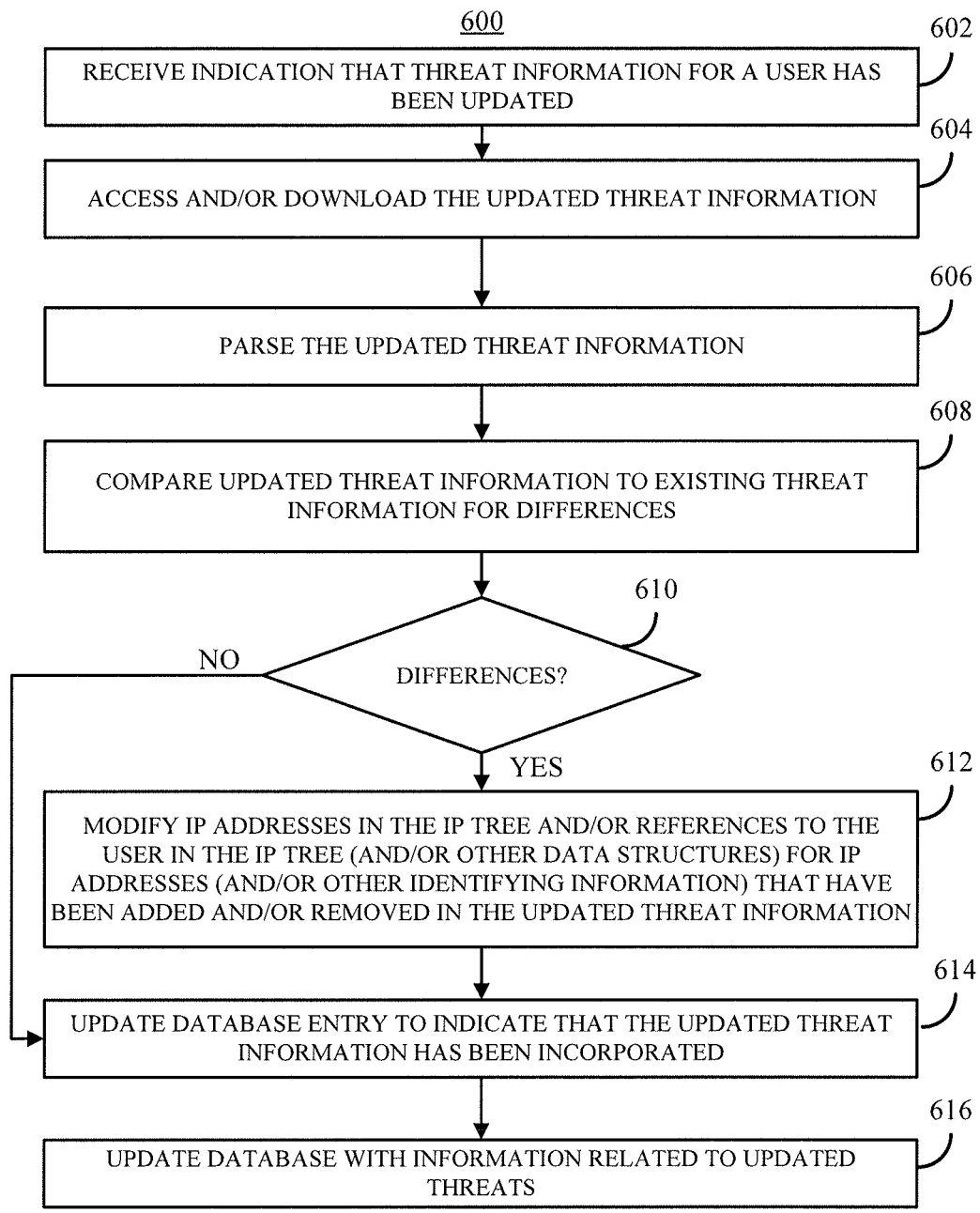
FIG. 6 is a flowchart of an example process for creating and/or updating threat information for a user of a multi-tenant threat intelligence service in accordance with some embodiments of the disclosed subject matter.

FIG. 6 shows an example 600 of a process for creating and/or updating threat information for a user of a multi-tenant threat intelligence service in accordance with some embodiments of the disclosed subject matter. As shown in FIG. 6, at 602, process 600 can receive an indication that new and/or updated threat information associated with a user is available. In some embodiments, the indication can be any suitable indication that the threat information has been updated, and can include any suitable identifying information. For example, in some embodiments, process 600 can receive a message (e.g., from computing device 102) indicating that threat information has been updated. In such an example, the message can include identifying information of the user (e.g., associated with computing device 102), identifying information of the threat information (e.g., a name of the source, a name of the threat information, a filename, etc.), and/or location information of the threat information. As another example, process 600 can receive threat information (e.g., threat information 104). As described above in connection with FIG. 1, in some embodiments, process 600 can receive such a message using a frontend (e.g., frontend 114).

In some embodiments, process 600 can limit the amount of times a user can update threat information associated with the user account over a particular period of time. For example, in some embodiments, process 600 can determine whether the user has sent an indication that threat information has been updated in a predetermined time period (e.g., fifteen minutes, thirty minutes, etc.) before the indication is received at 602. As another example, in some embodiments, process 600 can determine whether the user has sent an indication that threat information has been updated more than a threshold number of times (e.g., two times, three times, etc.) within a predetermined time period (e.g., an hour, twelve hours, one day, etc.).

At 604, process 600 can access and/or download the updated threat information at a location associated with the user and/or threat information. In some embodiments, process 600 can use any suitable technique or combination of techniques to access the updated threat information. For example, as described above in connection with FIG. 1, process 600 can access a file (e.g., threat information 104) uploaded to an electronic data store associated with the user (e.g., electronic data store 106). In such an example, process 600 (and/or a computing device, service, and/or account associated with process 600) can have permissions to access the electronic data store associated with the user with updated threat information. As another example, process 600 can access a file (e.g., threat information 104) uploaded to an electronic data store associated with a computing device executing process 600 (and/or a service and/or account associated with process 600). In some embodiments, process 600 can download and/or otherwise copy threat information from any other suitable source, such as a web server identified by the user, a storage service identified by the user.

In some embodiments, process 600 can create and/or modify a database entry (e.g., in threat intelligence database 118) corresponding to the new and/or updated threat information. Such a database entry can, for example, indicate a status of the new and/or updated threat information (e.g., whether the threat information has been incorporated into the in-memory IP address tree). As another example, such a database entry can include identifying information of the new and/or updated threat information (e.g., as identified by computing device 102).

At 606, process 600 can parse the new and/or updated threat information to identify one or more IP addresses that correspond to potential threats included in the threat information accessed and/or downloaded at 604. Additionally, in some embodiments, process 600 can parse the new and/or updated threat information to identify any other suitable information, such as domain name, other indicators, descriptive information regarding the threat, identifying information of one or more sources of the information, etc. In some embodiments, process 600 can use any suitable technique or combination of techniques to parse the information. For example, as described above in connection with FIG. 1, process 600 can use a network-accessible services system to parse the new and/or updated threat information. As another example, process 600 can search the threat information for individual threat information by searching for particular symbols or combinations of symbols, particular strings of text, etc.

At 608, process 600 can compare the new and/or updated threat information to existing threat information associated with the user of computing device 102. Process 600 can use any suitable technique or combination of techniques to compare the new and/or updated information to existing information. For example, process 600 can search previously submitted threat information associated with the same user fort any existing threat information that corresponds to the new and/or updated threat information. In a more particular example, process 600 can search database entries associated with the user of computing device 102 (e.g., in threat intelligence database 118). Additionally, in some cases, process 600 can search entries that correspond to the same source of the new and/or updated threat information. In some embodiments, process 600 can use a network-accessible services system to compare the new and/or updated threat information to previously submitted threat information.

If there are no differences between the new and/or updated information and the previously submitted threat information ("NO" at 610), process 600 can move to 616 and indicate that the new and/or updated threat information has been incorporated into the in-memory IP address tree (e.g., by modifying the database entry created and/or modified at 604). Otherwise, if there are differences between the new and/or updated information and the previously submitted threat information ("YES" at 610), process 600 can move to 612.

At 612, process 600 can modify IP addresses and/or references to the user in the in-memory IP address tree for an IP address(es) for IP addresses that have been added and/or removed in the updated threat information. In some embodiments, process 600 can remove and/or modify references to the user for IP addresses in the in-memory IP address tree that are no longer present in the updated threat information and/or remove the IP address(es) from the tree if the reference to that IP address for the user is the only remaining reference associated with that IP address. For example, in some embodiments, process 600 can remove a reference from an IP address in the in-memory IP address if the IP address is not included in the new and/or updated threat information. As another example, in some embodiments, process 600 can remove references to the user in the in-memory IP address tree for an IP address not included in the new and/or updated threat information (and, in some cases the IP address) when the IP address has not appeared in new and/or updated threat information provided by the user for at least a threshold amount of time (e.g., one day, one week, etc.) and/or times (e.g., not in the last update, not in the last three updates, etc.).

In some embodiments, at 612, process 600 can add and/or update references to the user in the in-memory IP address tree for IP addresses that are newly added in the new and/or updated threat information. For example, process 600 can associate an IP address(es) from the new and/or updated threat information with information identifying the user. Additionally, as described above in connection with FIG. 1, process 600 can associate the IP address(es) from the new and/or updated threat information with information that can be communicated to a user to indicate the nature of the threat associated with the IP address (e.g., based on the description in the threat information). In some embodiments, process 600 can add an IP address from the threat information to the in-memory IP if the IP address is not already represented in the in-memory IP address tree.

As described above, at 614, process 600 can update the database entry for the new and/or updated threat information to indicate that the new and/or updated threat information has been incorporated into the in-memory IP address tree.

At 616, process 600 can update a database corresponding to threat information provided by a particular user to reflect information included in the new and/or updated threat information. For example, process 600 can update entries in threat intelligence database 118 to reflect the new and/or updated threat information that has been added to the in-memory IP address tree, remove information corresponding to an IP address that the user is no longer associated with (e.g., because the IP address was not included in the new and/or updated threat information).

Figure 7:
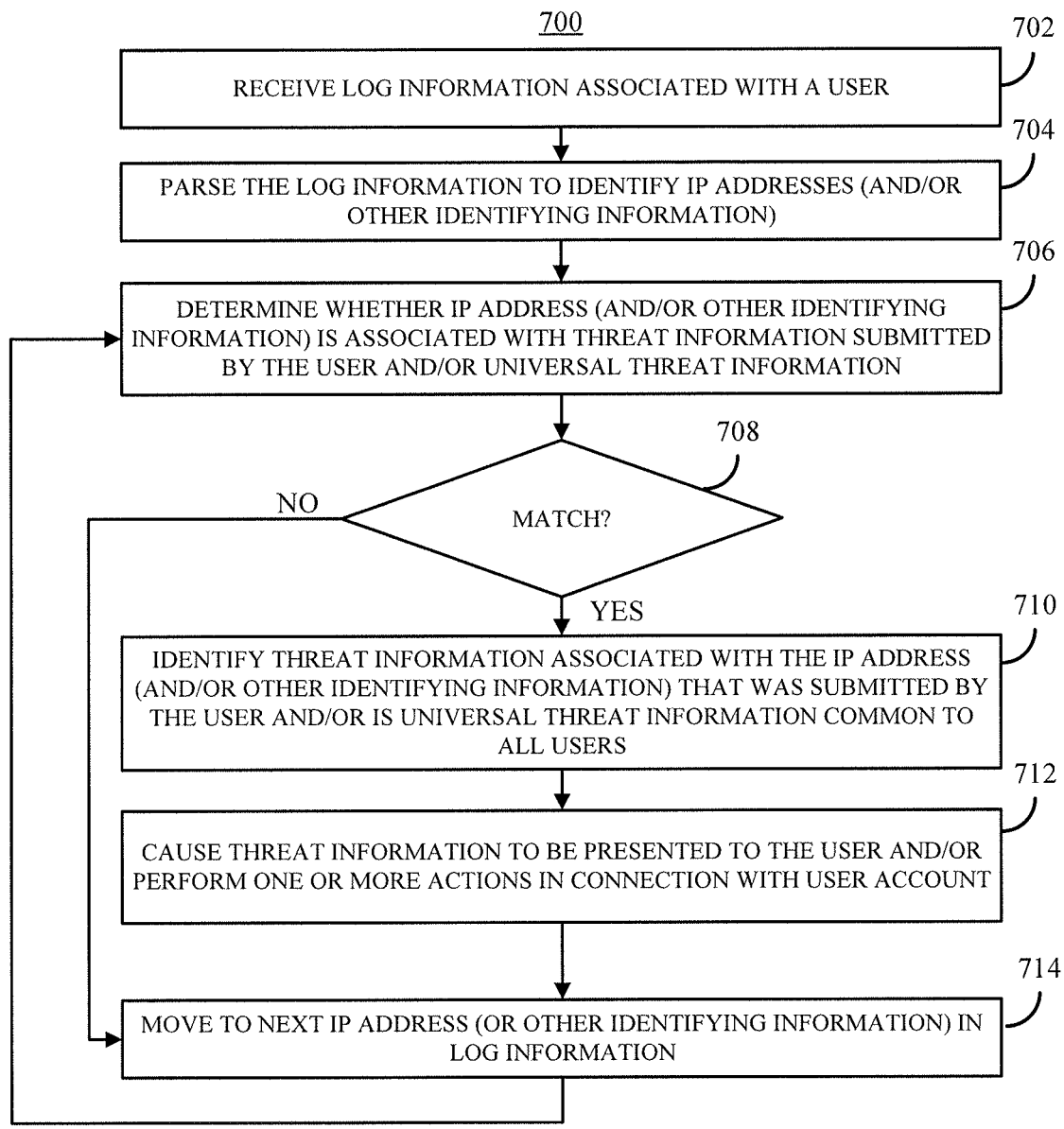
FIG. 7 is a flowchart of an example process for monitoring activity associated with a particular user account in accordance with some embodiments of the disclosed subject matter.

FIG. 7 shows an example 700 of a process for monitoring activity associated with a particular user account in accordance with some embodiments of the disclosed subject matter. As shown in FIG. 7, at 702, process 700 can receive log information (e.g., log information 122, new log information 306, etc.) associated with a user account (e.g., a user associated with computing device 102). As described above in connection with FIG. 1, the log information can include network activity to and/or from computing devices associated with the user (e.g., to/from a virtual network associated with the user, to/from one or more servers associated with the user, etc.), and/or any calls made to APIs from the user's account (e.g., APIs for services available from the same service provider providing the threat intelligence service, APIs for services available from a service associated with the service provider providing the threat intelligence service, etc.).

At 704, process 700 can parse the log information (if necessary) to identify IP addresses included in the log information. In some embodiments, process 700 can use any suitable technique or combination of techniques to parse the log information. For example, as described above in connection with FIG. 1, process 700 can use a network-accessible services system to parse the log information.

At 706, process 700 can determine, for a first IP address in the log information, whether the IP address is associated with threat information submitted by the user and/or universal threat information (e.g., provided by a service provider providing access to process 700). Process 700 can use any suitable technique or combination of techniques to determine whether each IP address matches an IP address. For example, as described above in connection with FIG. 1, process 700 can look up each IP address using an in-memory IP address tree to determine whether the IP address is represented in the tree, and if it is, whether it is associated with universal threat information (i.e., common to all users) and/or with threat information submitted by the user (e.g., in log information 122). Additionally, in some embodiments, the IP address can be associated with an indication that the user has requested that the IP address not be flagged as being potentially malicious regardless of whether there is universal or user-specific threat information associated with the IP address (e.g., the IP address has been white listed by the user). In some embodiments, one or more portions of process 700 can be carried out in parallel by many different computing devices simultaneously. For example, as described above in connection with FIGS. 1 and 5, process 700 can route one or more portions of received log information to a computing device (e.g., a VM instance) maintaining a replica of an in-memory IP address tree based on the workload of various VM instances maintaining replicas of the in-memory IP address tree.

If the IP address from the log information does not match an IP address in the in-memory IP address tree that is associated with universal and/or user-specific threat information (or matches, but the IP address has been white listed by the user) ("NO" at 708), process 700 can move to 714 and move to a next IP address from the log information (if one exists). Note that an IP address from the log information may match an IP address in the in-memory IP address tree even if the IP address is not associated with universal threat information or threat information specific to the user that submitted the log information. For example, the in-memory IP address tree can include the IP address from the log information in association with threat information submitted by another user (but not submitted by the user associated with the log information). In some embodiments, process 700 can inhibit any action(s) (e.g., as described below in connection with 712) from being taken in connection the threat information associated with that IP address using any suitable technique or combination of techniques. For example, process 700 can inhibit an action from being taken by moving to 714 without performing any further actions. As another example, process 700 can inhibit the user from being notified, but can take another action, such as recording information indicating that the IP addresses was identified as being potentially malicious in association with an indication of the source of the threat information submitted by another user in association with that IP address. In such an example, if the user later uploads the same threat information from the same source, process 700 can indicate that previous activity was detected as being potentially malicious as part of a process of associating the new user-submitted threat information (e.g., as part of process 600) with the IP address tree. Otherwise, if the IP address from the log information matches an IP address in the in-memory IP address tree that is associated with universal and/or user-specific threat information ("YES" at 708), process 700 can move to 710.

At 710, process 700 can identify specific threat information associated with the IP address that was submitted by the user and/or that is universal threat information that is common to all users of the threat intelligence system. Process 700 can use any suitable technique or combination of techniques to identify threat information. For example, descriptive information about the threat potentially posed by the IP address (and/or any other suitable information) can be stored in connection with the IP address in the in-memory IP address tree. As another example, descriptive information about the threat potentially posed by the IP address (and/or any other suitable information) can be stored in a database (e.g., threat intelligence database 118), and the IP address (or any other suitable identifying information, which may be stored in connection with the in-memory IP address tree) can be used to access the threat information submitted by the user and/or universal threat information.

At 712, process 700 can take a security action based on the threat information. In some embodiments, process 700 can cause threat information to be sent and/or otherwise provide access to a user. Additionally or alternatively, in some embodiments, process 700 can perform one or more actions in connection with the user account based on the threat information. For example, in some embodiments, process 700 can cause a message (e.g., an email, a push notification, a text message, a secure message accessible through a user interface for the threat intelligence service accessible through the frontend, a website interface, etc.) to be transmitted to the user associated with the user account that provided the log information with identifying information of the IP address, a description of the threat potentially posed by the IP address, information identifying what sort of activity was associated with the IP address, etc. As another example, in some embodiments, process 700 can store a message in an electronic data store associated with the user (e.g., electronic data store 106). As still another example, process 700 can make the threat information available as part of a document (e.g., a webpage, an xml document, etc.) that a computing device associated with the user (e.g., computing device 102) can access for threat information.

Additionally or alternatively, in some embodiments, at 712, process 700 can take one or more actions on behalf of the user based on the threat information identified at 710 (e.g., as described above in connection with FIG. 1). For example, in a case where a user account associated with the user has sent a request to an API from a potentially malicious IP address, process 700 can, at least temporarily, cause access by that user account to be suspended. As another example, in a case where information was received by one or more computing devices associated with the user from a potentially malicious IP address, process 700 can, at least temporarily, inhibit further traffic from that IP address to the computing devices associated with the user. As still another example, in a case where information was sent by one or more computing devices associated with the user to a potentially malicious IP address, process 700 can, at least temporarily, inhibit further traffic from that being sent to that IP address from computing devices associated with the user.

At 714, process 700 can move to a next IP address from the log information to determine whether it is associated with universal and/or user-specific threat information. Additionally or alternatively, process 700 can determine whether any suitable number of IP addresses are associated with universal and/or user-specific threat information in parallel.

Figure 8:
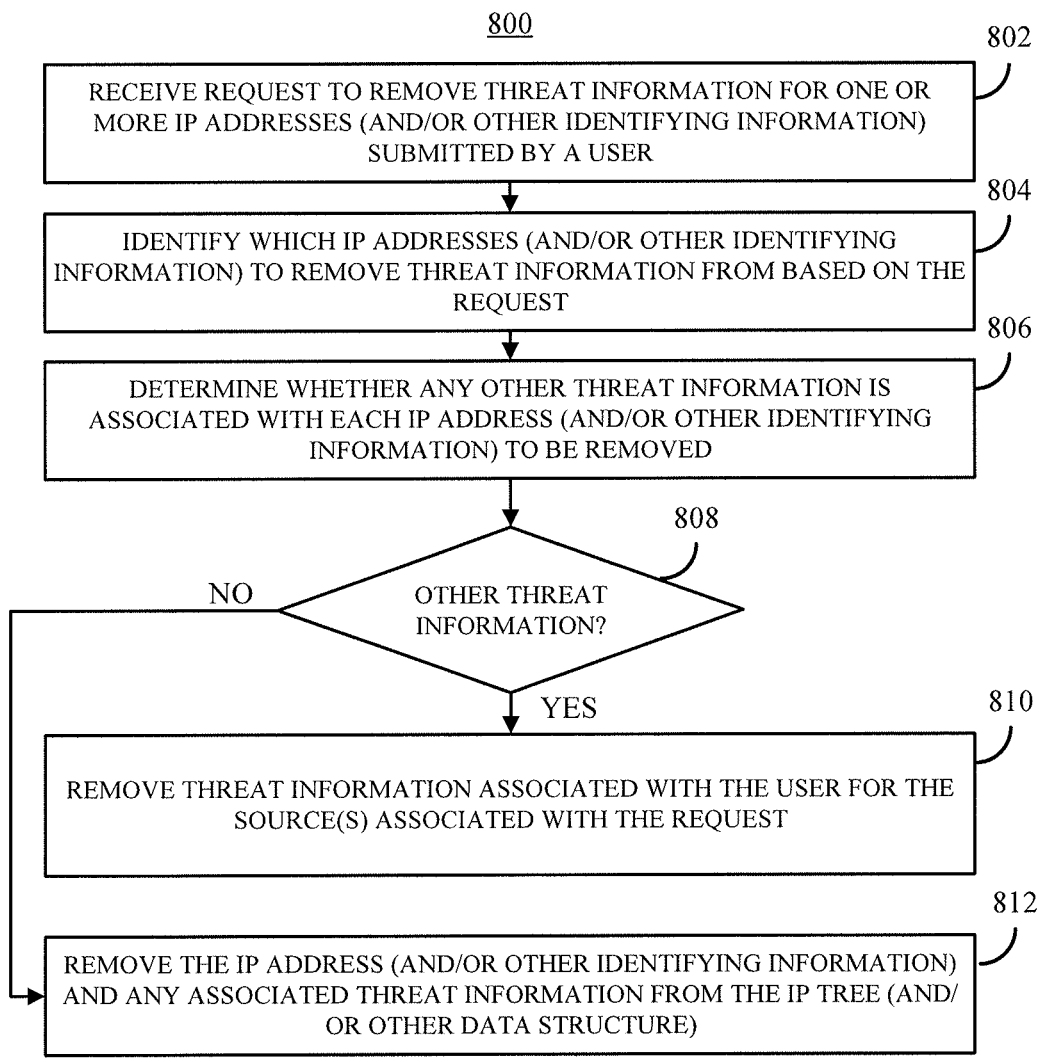
FIG. 8 is a flowchart of an example process for removing threat information from a particular source for a particular user in accordance with some embodiments of the disclosed subject matter.

FIG. 8 shows an example 800 of a process for removing threat information from a particular source for a particular user in accordance with some embodiments of the disclosed subject matter. As shown in FIG. 8, at 802, process 800 can receive a request to remove threat information for a user from one or more IP addresses for which threat information was submitted by the user. For example, in some embodiments, process 800 can receive a request from a user to cancel their access to the threat intelligence service. In such an example, the request can serve as a request to remove all user-specific threat information submitted by the user. As another example, in some embodiments, process 800 can receive a request to remove threat information corresponding to a particular list that was submitted by a user. In such an example, the list can be identified by name, location, etc.

At 804, process 800 can identify which IP addresses to remove threat information from for the user based on the request. Process 800 can use any suitable technique or combination of techniques to identify which IP addresses to remove the threat information from. For example, process 800 can access a database (e.g., threat intelligence database 118) to determine which IP addresses are associated with the user and/or list identified in the request. As another example, process 800 can access the most recent copies of threat information submitted by the user to determine which IP addresses are associated with user-specific threat information for that user and/or list.

At 806, process 800 can determine whether any other threat information is associated with each IP address for which threat information for the user is to be removed. Process 800 can use any suitable technique or combination of techniques to determine whether any other threat information is associated with each IP address. For example, process 800 can access the IP address in the in-memory IP address tree to determine whether that IP address is associated with universal threat information and/or user-specific threat information corresponding to another user and/or another source for the user.

If there is other threat information associated with an IP address for which user-specific threat information for the user is to be removed ("YES" at 808), process 800 can move to 810, and remove threat information associated with the user for the source(s) associated with the request. In such an example, there can be user-specific threat information for the user still associated with the IP address after threat information corresponding to a particular source is removed from that IP address.

Otherwise, if there is no other threat information associated with an IP address for which user-specific threat information for the user is to be removed ("NO" at 808), process 800 can move to 812. At 812, the IP address for which there is now no longer associated threat information can be removed from the in-memory IP address tree entirely. As described above in connection with FIG. 2, changes to the IP address tree and/or changes to which threat information (associated with which user) is associated with particular IP addresses can be updated using a dynamic copy of the in-memory IP address tree, which can be used to replace the read-only in-memory IP address tree that is used to determine whether a particular IP address is associated with threat information.

Although processes 600, 700 and 800 are generally described as identifying potentially malicious IP addresses from log information using in-memory IP address tree, this is merely an example, and any suitable identifying information related to activity associated with the user's account can be used to identify potentially malicious activity associated with the user's compute resources (e.g., URLs, domain names, file hashes, file signatures, process activity, etc.) from any suitable data structure (e.g., a hash table, a database, a file system, a document, a prefix tree, etc.).

In accordance with some embodiments of the disclosed subject matter, a system is provided, the system comprising: a first electronic data store configured to store threat information describing suspected sources of malicious computing activity; and one or more hardware computing devices in communication with the first electronic data store and configured to execute specific computer-executable instructions that upon execution cause the system to: receive first threat information identifying suspected malicious remote endpoints from a plurality of customers of a service provider, the first threat information being incorporated into the threat information stored in the first electronic data store; generate an in-memory data structure of endpoint identifiers using at least the first threat information, wherein a first user account is associated with at least a portion of the endpoint identifiers in the in-memory data structure; receive first log information describing network activity of a first virtual machine hosted on a server operated by the service provider, the first virtual machine associated with the first user account, wherein the first log information identifies a first remote endpoint; determine that an entry for the first remote endpoint is in the in-memory data structure of endpoint identifiers and the first user account is associated with the entry for the first remote endpoint; and perform a first action associated with a detection of the malicious computing activity.

In some embodiments, execution of the specific computer-executable instructions further causes the system to: receive second log information describing network activity of a second virtual machine associated with a second user account, wherein the second log information identifies a second remote endpoint; determine that the second user account is not associated with an entry for the second remote endpoint in the in-memory data structure of endpoint identifiers; and inhibit the second remote endpoint from being identified to the second user as representing potentially malicious network activity by the second virtual machine.

In some embodiments, the first threat information includes a first IP address and the endpoint identifiers are IP addresses, and wherein execution of the specific computer-executable instructions further causes the system to modify the in-memory data structure to include an additional entry corresponding to the first IP address, the additional entry associated with information indicating that the first IP address was submitted by the first user.

In some embodiments, the one or more hardware computing devices comprise memory and wherein execution of the specific computer-executable instructions further causes the system to: create in the memory an IP address tree comprising a plurality of nodes each associated with a corresponding malicious IP address of a plurality of malicious IP addresses included in the threat information stored in the electronic data store, wherein the IP address tree is read-only; create, as the in-memory data structure, a copy of the IP address tree in the memory, wherein the plurality of endpoint identifiers of the in-memory data structure are the plurality of nodes of the IP address tree; determine that the first threat information includes a first suspected malicious IP address; update the copy of the IP address tree to include the first suspected malicious IP address; use the read-only IP address tree when determining whether a particular IP address is represented in the IP address tree; and replace the IP address tree with the copy of the IP address tree after a predetermined period of time.

In some embodiments, a system is provided, the system comprising one or more hardware computing devices configured to execute specific computer-executable instructions that upon execution cause the one or more hardware computing devices to: store threat information in a data store, the threat information including threat information from a plurality of customers of a service provider; receive, from a first user account associated with the service provider, first threat information to add to the threat information in the data store to generate threat information for the first user account; identify, based on the first threat information, potentially malicious activity within computing activity associated with a computing environment; and in response to identifying the potentially malicious activity, perform an action.

In some embodiments, the first threat information comprises a first plurality of IP addresses, and the data store includes universal threat information comprising a second plurality of IP addresses, and execution of the computer-specific instructions further causes the one or more hardware computing devices to: modify an in-memory IP address tree using the first plurality of IP addresses to associate each of the first plurality of IP addresses in the in-memory IP address tree with the first threat information; modify the in-memory IP address tree using the second plurality of IP addresses to associate each of the second plurality of IP addresses in the in-memory IP address tree with the universal threat information; receive first log information corresponding to a portion of the computing activity that is associated with the first user, wherein the first log information comprises a third plurality of IP addresses corresponding to network activity associated with a first computing resource; and to determine that the portion of the computing activity includes the potentially malicious activity, determine that a first suspected malicious IP address of the third plurality of IP addresses is represented in the in-memory IP tree.

In some embodiments, execution of the specific computer-executable instructions further causes the one or more hardware computing devices to: determine that a second IP address included in the third plurality of IP addresses corresponds to an IP address in the in-memory IP address tree associated with universal threat information; and in response to determining that the second IP address corresponds to the IP address in the in-memory IP address tree the potentially malicious activity, perform a second action.

In some embodiments, execution of the specific computer-executable instructions further causes the one or more hardware computing devices to: receive a message from the first user that the first threat information is stored in an electronic data store associated with the first user; and retrieve the first threat information from the electronic data store.

In some embodiments, the first log information comprises identifying information of one or more remote endpoints that one or more computing devices associated with the first user received communications from, and identifying information of one or more remote endpoints that the one or more computing devices associated with the first user sent communications to.

In some embodiments, the one or more computing devices are virtual machine instances provided by a compute service used by the first user.

In some embodiments, the first log information comprises one or more IP addresses from which application program interface ("API") calls were made using credentials associated with the first user.

In some embodiments, execution of the specific computer-executable instructions further causes the one or more hardware computing devices to: create a database entry responsive to receiving the first threat information, wherein the database entry includes information indicating that the first threat information is not integrated into a data structure representing the universal threat information and threat information received from a plurality of users; and modify the database entry to indicate that the first threat information has been integrated into the data structure responsive to modifications based on the first threat information being completely integrated into the data structure.

In some embodiments, the first threat information comprises a first hash of a first file, and execution of the specific computer-executable instructions further causes the one or more hardware computing devices to: modify a hash table using the first hash to associate the first hash in the hash table with the first threat information; receive first log information corresponding to a portion of the computing activity that is associated with the first user, wherein the first log information comprises a second hash of a second file corresponding to a file received by a first computing resource; and to determine that the portion of the computing activity includes the potentially malicious activity, determine that the second hash matches the first hash in the hash table.

In some embodiments, a method is provided, the method comprising: storing threat information in a data store, the threat information including threat information from a plurality of customers of a service provider; receiving, from a first user account associated with the service provider, first threat information to add to the threat information in the data store to generate threat information for the first user account; identifying, based on the first threat information, potentially malicious activity within computing activity associated with a computing environment; and in response to identifying the potentially malicious activity, performing an action.

In some embodiments, the first threat information comprises a first plurality of IP addresses and the data store includes universal threat information comprising a second plurality of IP addresses, and the method further comprises: modifying an in-memory IP address tree using the first plurality of IP addresses to associate each of the first plurality of IP addresses in the in-memory IP address tree with the first threat information; modifying the in-memory IP address tree using the second plurality of IP addresses to associate each of the second plurality of IP addresses in the in-memory IP address tree with the universal threat information; receiving first log information corresponding to a portion of the computing activity that is associated with the first user, wherein the first log information comprises a third plurality of IP addresses corresponding to network activity associated with a first computing resource; and to determine that the portion of the computing activity includes the potentially malicious activity, determining that a first suspected malicious IP address of the third plurality of IP addresses is represented in the in-memory IP tree.

In some embodiments, receiving the threat information from the first user further comprises: receiving a message from the first user that the first threat information is stored in an electronic data store associated with the first user; and retrieving the first threat information from the electronic data store.

In some embodiments, the log information comprises identifying information of one or more remote endpoints that one or more computing devices associated with the first user received communications from, and identifying information of one or more remote endpoints that the one or more computing devices associated with the first user sent communications to.

In some embodiments, the one or more computing devices are virtual machine instances provided by a compute service used by the first user.

In some embodiments, the log information comprises one or more IP addresses from which application program interface ("API") calls were made using credentials associated with the first user.

In some embodiments, the method further comprises: creating a database entry responsive to receiving the first threat information, wherein the database entry includes information indicating that the first threat information is not integrated into a data structure representing the universal threat information and threat information received from a plurality of users; and modifying the database entry to indicate that the first threat information has been integrated into the data structure responsive to modifications based on the first threat information being completely integrated into the data structure.

In some embodiments, any suitable computing device or combination of computing devices can execute one or more portions of processes 600, 700, and 800. For example, one or more computing devices associated with threat intelligence service 110 can execute one or more portions of processes 600, 700, and/or 800.

Although subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes of FIGS. 6-8 can be executed or performed in any order or sequence not limited to the order and sequence shown and described in the figures. Also, some of the above steps of the processes of FIGS. 6-8 can be executed or performed substantially simultaneously where appropriate or in parallel to reduce latency and processing times.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
a first electronic data store configured to store threat information describing suspected sources of malicious computing activity; and
one or more hardware computing devices in communication with the first electronic data store and configured to execute specific computer-executable instructions that upon execution cause the system to:
receive first threat information identifying suspected malicious remote endpoints from a plurality of customers of a service provider, the first threat information being incorporated into the threat information stored in the first electronic data store;
determine that the first threat information includes a first suspected malicious endpoint identifier;
update a copy of a first read-only in-memory tree data structure to include the first suspected malicious endpoint identifier;
generate a second read-only in-memory tree data structure of endpoint identifiers by replacing the first read-only in-memory tree data structure with the copy of the first read-only in-memory tree data structure after a predetermined period of time;
associate a first user account with at least a portion of the endpoint identifiers in the second read-only in-memory tree data structure;
receive first log information describing network activity of a first virtual machine hosted on a server operated by the service provider, the first virtual machine associated with the first user account, wherein the first log information identifies a first remote endpoint;
determine that an entry for the first remote endpoint is in the second read-only in-memory tree data structure of endpoint identifiers and the first user account is associated with the entry for the first remote endpoint; and
perform a first action associated with a detection of the malicious computing activity.

2. The system of claim 1, wherein execution of the specific computer-executable instructions further causes the system to:
receive second log information describing network activity of a second virtual machine associated with a second user account, wherein the second log information identifies a second remote endpoint;
determine that the second user account is not associated with an entry for the second remote endpoint in the in-memory tree data structure of endpoint identifiers; and
inhibit the second remote endpoint from being identified to the second user as representing potentially malicious network activity by the second virtual machine.

3. The system of claim 1, wherein the first threat information includes a first IP address and the endpoint identifiers are IP addresses, and wherein execution of the specific computer-executable instructions further causes the system to modify the in-memory tree data structure to include an additional entry corresponding to the first IP address, the additional entry associated with information indicating that the first IP address was submitted by the first user.

4. The system of claim 1, wherein the one or more hardware computing devices comprise memory and wherein execution of the specific computer-executable instructions further causes the system to:
   create the first read-only tree data structure as a first read-only IP address tree comprising a plurality of nodes each associated with a corresponding malicious IP address of a plurality of malicious IP addresses included in the threat information stored in the electronic data store;
   create a copy of the first read-only IP address tree;
   determine that the first threat information includes a first suspected malicious IP address;
   update the copy of the first read-only IP address tree to include the first suspected malicious IP address;
   use the first read-only IP address tree when determining whether a particular IP address is represented in a current read-only IP address tree; and
   replace the first read-only IP address tree with the copy of the first read-only IP address tree after a predetermined period of time, thereby generating the second read-only in-memory tree data structure.

5. A system, comprising one or more hardware computing devices configured to execute specific computer-executable instructions that upon execution cause the one or more hardware computing devices to:
   store threat information in a data store, the threat information including threat information from a plurality of customers of a service provider;
   receive, from a first user account associated with the service provider, first threat information to add to the threat information in the data store to generate threat information for the first user account;
   create a database entry responsive to receiving the first threat information, wherein the database entry includes information indicating that the first threat information is not integrated into a data structure representing universal threat information and threat information received from a plurality of users;
   modify the database entry to indicate that the first threat information has been integrated into the data structure responsive to modifications based on the first threat information being completely integrated into the data structure;
   identify, based on the first threat information, potentially malicious activity within computing activity associated with a computing environment; and
   in response to identifying the potentially malicious activity, perform an action.

6. The system of claim 5, wherein the first threat information comprises a first plurality of IP addresses, and the data store includes universal threat information comprising a second plurality of IP addresses, and execution of the computer-specific instructions further causes the one or more hardware computing devices to:
   modify an in-memory IP address tree using the first plurality of IP addresses to associate each of the first plurality of IP addresses in the in-memory IP address tree with the first threat information;
   modify the in-memory IP address tree using the second plurality of IP addresses to associate each of the second plurality of IP addresses in the in-memory IP address tree with the universal threat information;
   receive first log information corresponding to a portion of the computing activity that is associated with the first user, wherein the first log information comprises a third plurality of IP addresses corresponding to network activity associated with a first computing resource; and
   to determine that the portion of the computing activity includes the potentially malicious activity, determine that a first suspected malicious IP address of the third plurality of IP addresses is represented in the in-memory IP address tree.

7. The system of claim 6, wherein execution of the specific computer-executable instructions further causes the one or more hardware computing devices to:
   determine that a second IP address included in the third plurality of IP addresses corresponds to an IP address in the in-memory IP address tree associated with universal threat information; and
   in response to determining that the second IP address corresponds to the IP address in the in-memory IP address tree associated with universal threat information, perform a second action.

8. The system of claim 5, wherein execution of the specific computer-executable instructions further causes the one or more hardware computing devices to:
   receive a message from the first user that the first threat information is stored in a first electronic data store associated with the first user; and
   retrieve the first threat information from the first electronic data store.

9. The system of claim 6, wherein the first log information comprises identifying information of one or more remote endpoints that one or more computing devices associated with the first user received communications from, and identifying information of one or more remote endpoints that the one or more computing devices associated with the first user sent communications to.

10. The system of claim 9, wherein the one or more computing devices are virtual machine instances provided by a compute service used by the first user.

11. The system of claim 6, wherein the first log information comprises one or more IP addresses from which application program interface ("API") calls were made using credentials associated with the first user.

12. The system of claim 5, wherein the first threat information comprises a first hash of a first file, and execution of the specific computer-executable instructions further causes the one or more hardware computing devices to:
   modify a hash table using the first hash to associate the first hash in the hash table with the first threat information;
   receive first log information corresponding to a portion of the computing activity that is associated with the first user, wherein the first log information comprises a second hash of a second file corresponding to a file received by a first computing resource; and
   to determine that the portion of the computing activity includes the potentially malicious activity, determine that the second hash matches the first hash in the hash table.

13. A method, comprising:
   storing threat information in a data store, the threat information including threat information from a plurality of customers of a service provider;
   receiving, from a first user account associated with the service provider, first threat information to add to the threat information in the data store to generate threat information for the first user account;
   creating a database entry responsive to receiving the first threat information, wherein the database entry includes information indicating that the first threat information is not integrated into a data structure representing universal threat information and threat information received from a plurality of users;

modifying the database entry to indicate that the first threat information has been integrated into the data structure responsive to modifications based on the first threat information being completely integrated into the data structure;

identifying, based on the first threat information, potentially malicious activity within computing activity associated with a computing environment; and in response to identifying the potentially malicious activity, performing an action.

14. The method of claim 13, wherein the first threat information comprises a first plurality of IP addresses and the data store includes universal threat information comprising a second plurality of IP addresses, the method further comprising:

modifying an in-memory IP address tree using the first plurality of IP addresses to associate each of the first plurality of IP addresses in the in-memory IP address tree with the first threat information;

modifying the in-memory IP address tree using the second plurality of IP addresses to associate each of the second plurality of IP addresses in the in-memory IP address tree with the universal threat information;

receiving first log information corresponding to a portion of the computing activity that is associated with the first user, wherein the first log information comprises a third plurality of IP addresses corresponding to network activity associated with a first computing resource; and to determine that the portion of the computing activity includes the potentially malicious activity, determining that a first suspected malicious IP address of the third plurality of IP addresses is represented in the in-memory IP tree.

15. The method of claim 13, wherein receiving the threat information from the first user further comprises:

receiving a message from the first user that the first threat information is stored in a first electronic data store associated with the first user; and retrieving the first threat information from the first electronic data store.

16. The method of claim 14, wherein the first log information comprises identifying information of one or more remote endpoints that one or more computing devices associated with the first user received communications from, and identifying information of one or more remote endpoints that the one or more computing devices associated with the first user sent communications to.

17. The method of claim 16, wherein the one or more computing devices are virtual machine instances provided by a compute service used by the first user.

18. The method of claim 14, wherein the first log information comprises one or more IP addresses from which application program interface ("API") calls were made using credentials associated with the first user.

\* \* \* \* \*